United States Patent [19]

Sugano et al.

[11] Patent Number: 5,381,404
[45] Date of Patent: Jan. 10, 1995

[54] PACKET-SWITCHING COMMUNICATION NETWORK AND METHOD OF DESIGN

[75] Inventors: Masashi Sugano, Osaka; Hideo Miyahara, Nishinomiya; Masayuki Murata, Toyonaka, all of Japan

[73] Assignee: Mita Industrial Co., Ltd., Osaka, Japan

[21] Appl. No.: 89,860

[22] Filed: Jul. 12, 1993

[30] Foreign Application Priority Data

Jul. 14, 1992 [JP] Japan ................................ 4-187132
Sep. 16, 1992 [JP] Japan ................................ 4-246918

[51] Int. Cl.⁶ ......................... H04L 5/22; H04L 12/56
[52] U.S. Cl. ........................................ 370/13; 370/17; 370/60; 370/94.1
[58] Field of Search .............. 370/17, 54, 60, 60.1, 370/85, 6, 94.1, 94.2, 13; 379/220; 395/200, 909

[56] References Cited

U.S. PATENT DOCUMENTS

| | | | |
|---|---|---|---|
| 4,979,118 | 12/1990 | Kheradpir | 370/54 X |
| 5,038,340 | 8/1991 | Ochiai | 370/17 |
| 5,163,042 | 11/1992 | Ochiai | 370/17 |
| 5,267,232 | 11/1993 | Katsube et al. | 370/17 |

OTHER PUBLICATIONS

Tokumi Yokohira et al., "Fault Tolerant Packet-Switched Network Design and Its Sensitivity", Oct. 1991, IEEE Transactions on Reliability, vol. No. 4, pp. 452–460.

T. Yokohira et al., "Capacity Assignment Algorithm for Packet-Switching Network with Unreliable Links", Sep. 1991, Electronics and Communications in Japan, Part 1, vol. 74, No. 9, pp. 13–20.

E. D. Sykas et al., "Link Capacity Allocation In ATM Broadband Communication Networks", May 1991, 6th Mediterranean Electrotechnical Conference, vol. 1, pp. 497–500.

Gerla et al, *IEEE Transactions on Communications*, vol. COM-25, No. 1, pp. 48–60, Jan. 1977, "On the Topological Design of Distributed Computer Networks."

Nakajima et al, *Transaction of IEICE of Japan*, vol. 170-A, pp. 271–277, Feb., 1987, "Optimization of Packet-Switched Networks Under End'to-End Packet Transit Delay Constraints."

Saksena, *IEEE Journal on Selected Areas in Communications*, vol. 7, No. 8, pp. 1243–1252, Oct., 1989, "Topological Analysis of Packet Networks."

Maruyama et al, *IBM Journal of Research and Development*, vol. 21, May 1977, pp. 254–263, "Discrete Link Capacity and Priority Assignments in Communication Networks."

Maruyama et al, *IBM Journal of Research and Development*, vol. 21, Jul. 1977, pp. 360–369, "Heuristic Design Algorithm for Computer Communication Networks with Different Classes of Packets."

Maruyama et al, *Proceeding of the Third International Computer Communication Conference*, Toronto, Aug., 1976, pp. 92–97, "Discrete Link Capacity Assignments in Communication Networks."

Garbow et al, *ACM Transactions on Mathematical Software*, vol. 14, No. 2, Jun. 1988, pp. 163–170, "Software for an Implementation of Weeks' Method for the Inverse Laplace Transform Problem."

Garbow et al, *ACM Transactions on Mathematical Software*, vol. 14, No. 2, Jun. 1988, pp. 171–176, "Algorithm 662 a Fortran Software Package for the Numerical Inversion of the Laplace Transform Based on Weeks."

*Primary Examiner*—Melvin Marcelo
*Attorney, Agent, or Firm*—Renner, Otto, Boisselle & Sklar

[57] ABSTRACT

A communication network and method of design thereof uses end-to-end delay distribution functions and loss probabilities as design constraint to ensure that all packets of all traffic classes on all end-to-end node pairs of the network reach a destination within a predetermined maximum allowable delay with a given probability. An end-to-end delay distribution function is determined for every end-to-end path for all traffic classes to find a path with a minimum distribution probability value. A distribution function is determined for each link of the path having a minimum distribution probability value to determine a most congested link, the capacity of which is increased until a given minimum probability value of distribution is determined.

30 Claims, 5 Drawing Sheets

PACKET-SWITCHING COMMUNICATION NETWORK AND METHOD OF DESIGN

BACKGROUND OF THE INVENTION

1. Field of the Invention

This invention relates generally to communication networks, and more particularly to a packet-switching communication network with different grades of service and method of design.

2. Description of the Related Art

Recently developed multimedia communication networks are expected to handle various kinds of information, such as voice, image, and data information, which have different demands of grade of service. Conventional network design methods are not particularly useful with respect to these kinds of networks because such conventional methods often times adopt an overall average delay as a design constraint to optimize a cost function.

More particularly, in designing packet switching networks, a conventional design criterion for determining capacity assignments for each link formed between nodes in a network has been network average delay. The network average delay is determined based on an average packet delay averaged over all link delays in the network for obtaining a network performance measure. Specifically, the average packet delay T is represented by $$T = \frac{1}{\gamma} \sum_{i \in \text{paths in the network}} \gamma_i Z_i \qquad (1)$$
$$= \frac{1}{\gamma} \sum_{j \in \text{links in the network}} \lambda_j T_j$$

where $$\gamma = \sum_i \gamma_i$$

and $\gamma_i$: packet rate loaded on path i
$Z_i$: average packet delay on path i
$\lambda_j$: packet rate on link j
$T_j$: average delay of link j.

See, for example, Kleinrock, QUEUEING SYSTEMS Volume II: Computer Applications, New York: John Wiley, 1976; and Gerla and Kleinrock, "On the Topological Design of Distributed Computer Networks", IEEE Transactions on Communications, Vol. COM-25, pp. 48–60, January 1977, the disclosures of which are incorporated herein by reference.

The above conventional design approach can result in a cost-effective network from the viewpoint of a network designer or network provider. However, from a user's point of view, such a design method implies that some users of the network will experience longer delays than the network average delay T. One particular disadvantage of networks designed based on a network average delay is that when the traffic rate on a particular path is low, the delay associated with that path does not contribute significantly to the network average delay. This can result in a very large delay for the traffic on that path, a delay in excess of the average delay time T. To overcome this problem, an average end-to-end delay constraint has been adopted in place of the network average delay criterion. See, for example, Nakajima and Miyake, "Optimization of Packet-Switched Networks Under End-to-End Packet Transit Delay Constraints", Transactions of IEICE of Japan, vol. J70-A, pp. 271–277, February 1987; and Saksena, "Topological Analysis of Packet Networks", IEEE Journal on Selected Areas in Communications, vol. 7, pp. 1243–1252, October 1989, the entire disclosures of which are incorporated herein by reference.

Still another shortcoming of conventional network design methods is that there typically is no discrimination between different classes of information having different demands of grade of service. For example, multimedia communication networks are often expected to handle different kinds of information often such as voice, image, data, etc. These different kinds of information have different demands of grade of service. For example, voice and image information require rapid information transfer while computer data typically is tolerant of comparatively longer delay constraints. Moreover, different packets of the same type of information may require different grades of service. Thus, a method is needed for designing and constructing a multimedia network which can handle multimedia information based upon different demands of grade of service.

While design methods have been proposed for networks with different priority classes of traffic (e.g., demands of grade of service), such methods often suffer from many of the same drawbacks as do conventional design methods for single class service. As an example, distinct network average delays for traffic classes have been used for the design criteria as described in Maruyama and Tang, "Discrete Link Capacity and Priority Assignments in Communication Networks", IBM Journal of Research and Development, vol. 21, pp. 254–263, May 1977; and Maruyama, Fratta and Tang, "Heuristic Design Algorithm for Computer Communication Networks with Different Classes of Packets", IBM Journal of Research and Development, vol. 21, pp. 360–369, July 1977.

According to another conventional design method, the average end-to-end delay for each class of traffic is considered, as is described in Maruyama and Tang, "Discrete Link Capacity Assignment in Communication Networks", Proceedings of the Third International Computer Communication Conference (Toronto), pp. 92–97, August 1976. The disclosures of each of the above-referenced articles is incorporated herein by reference.

However, a more important network performance measure, particularly in the case of high speed networks such as a B-ISDN (Integrated Service Digital Network), is the end-to-end delay distribution for every traffic class and path in the network. For example, the delay variation for voice and image traffic should be as small as possible. Conventional approaches of network design do not fully consider such criteria.

Another important yet often overlooked design criterion relates to loss probability. In a given network, the buffers located at each node for receiving information have a fixed length. As a result, a probability exists within the network that packets of information will overflow a respective buffer such that information will be lost. The probability that information may be lost typically could be quite small, e.g., on the order of $10^{-6}$. In some cases, such a loss probability would be acceptable. For example even if a portion of a packet including voice or certain image data was lost, there would be little influence on the overall quality of the information.

On the other hand, the quality of particular types of information, e.g., image data which is differentially compressed, computer data, etc., degenerates rapidly in the event even a portion of the data is lost. Network design approaches in the past did not fully consider these types of effects of loss probability. Moreover, conventional design approaches did not consider the effects of loss probability in connection with an end-to-end delay distribution for the network.

SUMMARY OF THE INVENTION

The present invention provides a packet switching communications network and a method for designing a packet switching communications network in which different grades of service are taken into account. Each traffic class is given a priority based on its demand of grade of service, and is transmitted on the basis of its priority at each node. The end-to-end delay distribution over the network is considered as a constraint. While total required cost (or combined link capacity) is sometimes slightly increased as compared with existing design methods, an end-to-end delay between every two nodes, even over a long distance in the network, can fall within an acceptable predetermined maximum allowable delay. Thus, while the network cost may be increased slightly, this sacrifice is efficiently made up in the overall end-to-end delay distribution which will meet the desired design parameters of the network as a whole. Those parameters are, for example, one or more of minimum probability (defined further below), maximum delay, network topology, end-to-end traffic rate matrix, average packet length, and network routing. Moreover, the present invention ensures that loss probability within the network is limited to a predetermined allowable value or less.

In accordance with one aspect of the invention, a method for producing packet-switching communication networks for handling multimedia information with different demands of grades of service is provided. Each class of traffic is given a priority based on its demand of grade of service and is transmitted on the basis of such priority at each node. The method of the present invention uses an end-to-end delay distribution as a design constraint so that all packets in each traffic class on every path can reach a destination node from a source node within a predetermined maximum allowable delay (which is identical in each traffic class independent of the distance) with a given probability (e.g., 99%). Thus, the method of the present invention provides a network in which every source-to-destination node pair in the network is provided with unified service independent of the distance between the two nodes.

In accordance with another aspect of the present invention, a method for producing a packet-switching communication network capable of handling different classes of information with different demands of grades of service is provided. The network transmits different classes of traffic on the basis of assigned priority at each node according to an end-to-end delay distribution to ensure that all packets of each traffic class on every path of the network reach a destination within a predetermined maximum allowable delay with a given probability.

According to a particular embodiment of the present invention, a method for producing a packet switching communications network includes the steps of setting an initial capacity for each link in the network, determining a most-congested link by calculation of a distribution function which defines a relationship between a transmission delay time and a probability that packets will reach a destination node from a source node within such delay time, and changing the capacity of the most-congested link until the value of each distribution function at a fixed maximum allowable delay time is equal to or greater than a given probability value for all paths from all source nodes to all destination nodes to render a network which allows all packets of all classes to reach a destination node from a source node within a predetermined maximum allowable delay time with a given probability.

In accordance with another aspect of the present invention, a network transmits packets of different classes of information on the basis of a priority so that all packets in each traffic class on each path of the network will reach a destination node within a predetermined maximum allowable delay with a given probability.

In accordance with another aspect of the present invention, a method for designing a packet-switching communication network having at least two nodes and at least one link from node-to-node for transmitting packets of a plurality of traffic classes is provided. Such a method includes the steps of: (1) setting an initial capacity for each link of the network; (2) obtaining, for each link, a capacity increment $\Delta C^d_i$ required for satisfying a delay distribution constraint; (3) obtaining, for each link, a capacity increment $\Delta C^l_i$ required for satisfying a loss probability constraint; (4) finding a largest one of the increments $\Delta C^d_i$ and the increments $\Delta C^l_i$, and modifying the capacity of a link associated with the largest increment; and (5) repeating steps (2) and (3) until a relationship of $\Delta C^d_i = \Delta C^l_i = 0$ is satisfied for all the links, resulting in a network which satisfies both the delay distribution constraint and the loss probability constraint.

In accordance with another aspect of the present invention, a packet-switching communication network having at least two nodes and at least one link from node-to-node for transmitting packets of a plurality of traffic classes is provided. Such a network satisfies both the following delay distribution constraint and loss probability constraint, the delay distribution constraint being:

$$P_{min} \leq P\{X_{pq;k} \leq T_k\} \text{ for all } p, q, k;$$

where $P\{X_{pq;k} \leq T_k\}$ is a probability that packets from a source node p in a traffic class k reach a destination node q within a delay time $T_k$ and $P_{min}$ is a constant probability value; and the loss probability constraint being:

$$L_{max;k} \leq L_{pq;k} \text{ for all } p, q, k;$$

where $L_{pq;k}$ is a probability that packets in a traffic class k from a source node p to a destination node q are lost and $L_{max;k}$ is a fixed probability value for each traffic class.

In accordance with another aspect of the present invention, an apparatus for designing a packet-switching communication network having at least two nodes and at least one link from node-to-node for transmitting packets of a plurality of traffic classes is provided. Such an apparatus includes: (1) means for setting an initial capacity for each link of the network; (2) means for obtaining, for each link, a capacity increment $\Delta C^d_i$ required for satisfying a delay distribution constraint; (3) means for obtaining, for each link, a capacity increment $\Delta C^l_i$ required for satisfying a loss probability constraint; (4) means for finding a largest one of said increments $\Delta C^d_i$ and said increments $\Delta C^l_i$, and modifying the capacity of a link associated with said largest increment; and (5) means for repeatly applying said means for obtaining $\Delta C^d_i$ and $\Delta C^l_i$ until a relationship of $\Delta C^d_i = \Delta C^l_i = 0$ is satisfied for all the links, resulting in a network which satisfies both the delay distribution constraint and the loss probability constraint.

In accordance with anther aspect of the present invention, a method of constructing a packet-switching communication network having at least two nodes and at least one link from node-to-node for transmitting packets of a plurality of traffic classes is provided. Such a method includes the steps of (1) setting an initial capacity for each link of the network; (2) obtaining, for each link, a capacity increment $\Delta C^d_i$ required for satisfying a delay distribution constraint; (3) obtaining, for each link, a capacity increment $\Delta C^l_i$ required for satisfying a loss probability constraint; (4) finding a largest one of the increments $\Delta C^d_i$ and the increments $\Delta C^l_i$, and modifying the capacity of a link associated with the largest increment; (5) repeating steps (2) and (3) until a relationship of $\Delta C^d_i = \Delta C^l_i = 0$ is satisfied for all the links; and (6) establishing the links between nodes having capacities based on the foregoing steps in the network, resulting in a network which satisfies both the delay distribution constraint and the loss probability constraint.

Thus, the present invention provides a method and apparatus in which an end-to-end delay distribution is used as a design constraint to ensure that all packets of all traffic classes reach a destination within a predetermined maximum allowable delay with a given probability. Because the total cost of the network is equal to the sum of the cost of each link, and the cost of each link is proportional to its capacity, the present invention further provides a method of optimizing cost effectiveness of network design and implementation by increasing the capacity only of links which do not satisfy the required delay distribution function.

These and other advantages of the present invention will become apparent upon reading and understanding the following detailed description made with reference to the accompanying figures.

DESCRIPTION OF THE PREFERRED EMBODIMENTS

Figure 1:
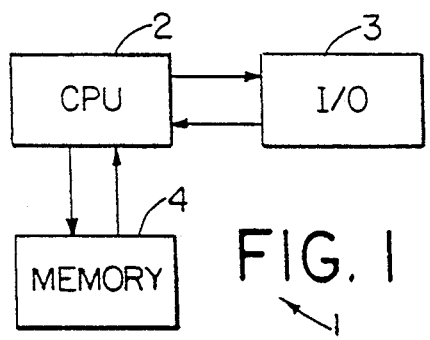
FIG. 1 is a block diagram of an apparatus for determining network link capacity assignments and total network cost of a network according to the present invention.

Referring now to the drawings, wherein like parts are designated by the same reference numerals, and initially referring to FIG. 1, an apparatus 1 for determining a capacity assignment of each link in a network based on distribution functions which derived and described below, is illustrated.

In the apparatus 1 of FIG. 1, a central processing unit (CPU) 2 performs various processes. An input/output (I/O) device(s) 3 allows an operator to input known parameters, such as the network topology including m links connecting n nodes (for example, refer to network topology of FIG. 2, below), an end-to-end traffic rate matrix $\gamma$ (for example, refer to Table 2, below), an average packet length $1/\mu_k$, a routing table (for example, refer to Table 1, below), a maximum allowable delay time $T_k$, a given or fixed probability value $P_{min}$ that the delay time will not exceed $t_k$, and a maximum loss probability $L_{max;k}$ selected as a design criteria. These parameters are stored in a memory 4 and are described in more detail below.

Figure 2:
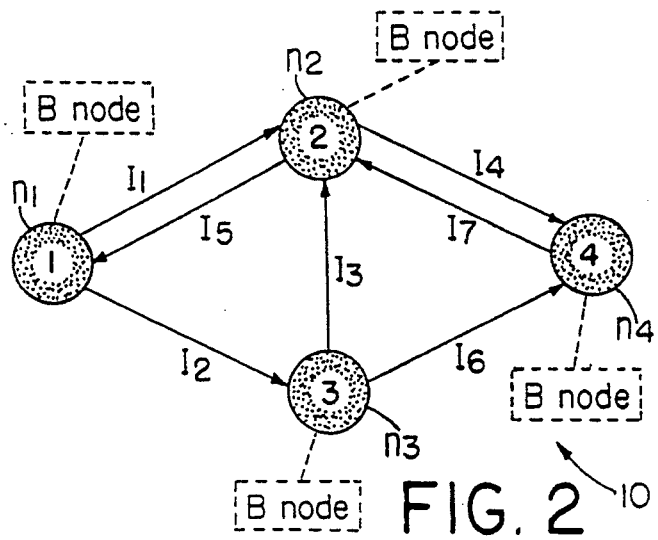
FIG. 2 is a schematic illustration of an exemplary communication network topology according to the present invention.
Figure 3:
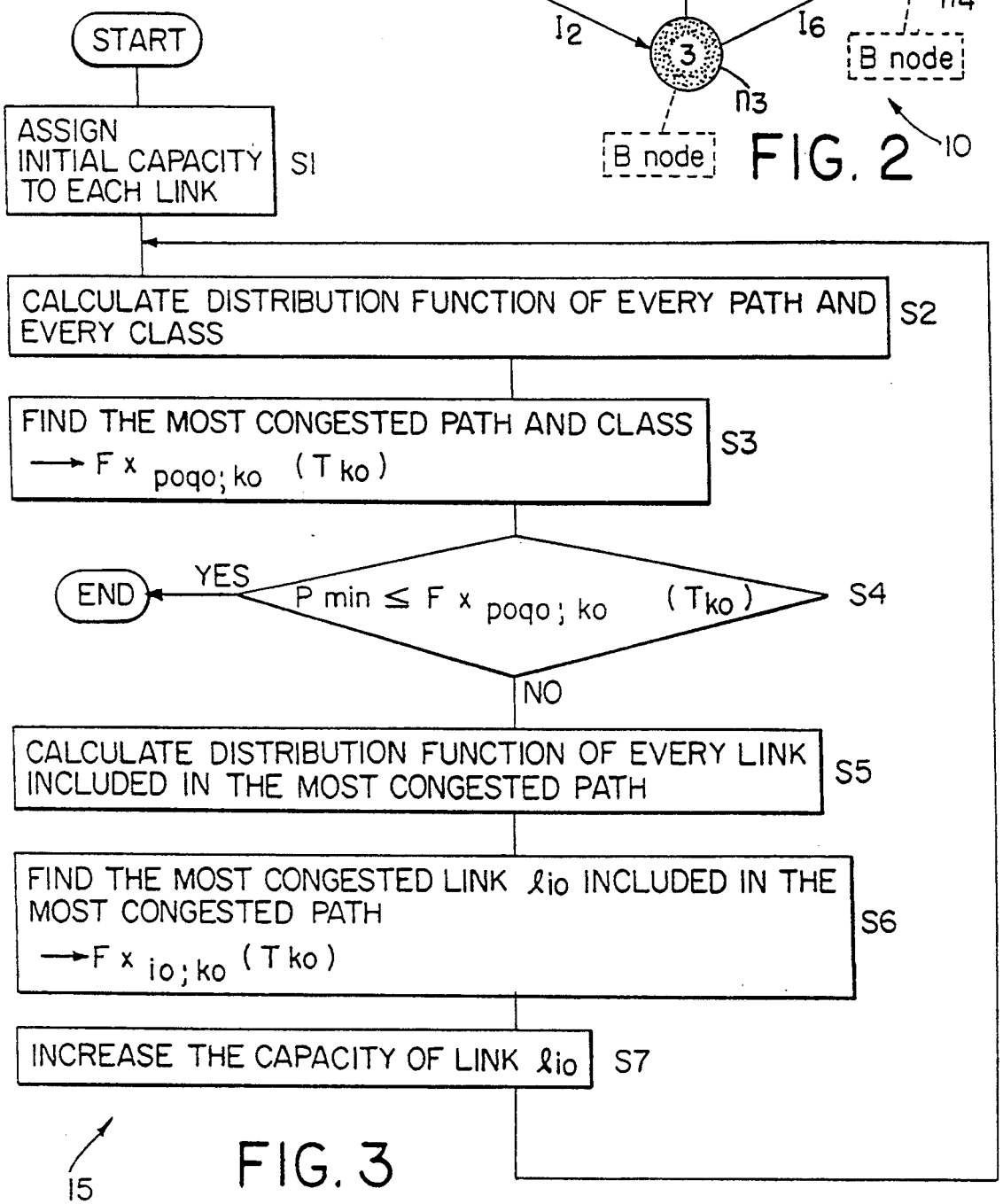
FIG. 3 is a flow chart illustrating steps for determining capacity assignments for network links based on delay distribution according to the present invention.

The CPU 2 calculates step by step according to the program depicted in the flow chart of FIG. 3 with reference to the parameters stored in the memory 4 and outputs the results, such as the capacity $C_i$ of each link in the network and the associated total network cost D through the I/O 3. The output results can be displayed, printed, and used indirectly or directly to design and/or to construct the network having a given topology. For example, based on the output results, a capacity assignment of each link is determined and the links having respective capacities can be implemented in a network. The output results can be used to design and/or to construct a network 10 (described below with respect to FIG. 2) or some other network.

Such a network according to the present invention can handle different grades of service. Traffic in the network is classified into a plurality of classes. Each class of traffic in the network is given a priority based on its demand of grade of service, and is transmitted on the basis of its priority at each node. The output of the apparatus 1 ensures that all packets in each traffic class on every path in the network can reach their destination within a predetermined maximum allowable delay (which is identical in each traffic class independent of the source-to-destination distance) with a given probability while substantially minimizing the total network cost or combined link capacity.

A network 10 which embodies features of the invention is shown in FIG. 2. The network 10 includes four nodes $n_1$-$n_4$ (sometimes referred to as packet switching nodes) and seven links $l_1$-$l_7$. The nodes and the links define the network topology. The capacity assignments for respective links are as determined below with consideration to the capacity requirement for each link, the probability that information will be able to be transmitted along a link or links within a prescribed time period, the cost of a link having a particular capacity. Moreover, the capacity assignments can be based on other parameters, as are described herein.

The links $l_i$ in network 10 connect respective nodes $n_i$ to each other to deliver signals, such as packets of information, from one node to another in the direction of the arrow heads on respective links. The signals may represent voice, image of data information, or any other type of information as may be desired. Although the nodes in FIG. 2 are shown connected to other nodes, it will be appreciated that other network topologies can be used in which the same or other nodes may be connected in a network and/or consist of other types of devices such as terminals, computers, facsimile, etc., as is well known.

Also, although the network 10 is shown with a specific number of nodes and links and a specific arrangement of links (directions and nodes connected), other networks with different numbers of nodes and links and/or arrangements of links may be similarly designed, built and used in accordance with the present invention, as will be appreciated by those having ordinary skill in the art in view of the present invention.

Referring to FIG. 3, a flow chart 15 illustrating the process steps carried out by the apparatus 1 in FIG. 1 to perform the method for determining the capacity of each link 1 of the network 10, based on the distribution functions derived and described below, is shown. The steps represented in the in flow chart 15 (as well as in flow chart 15' described below) may be written in an appropriate computer program language or code by a person who has ordinary skill in the art to operate the apparatus 1 consistent with those steps.

The steps represented in the flow chart 15 are most easily described in view of the following notation and assumptions:

Notation m: the number of links in a network
n: the number of nodes in a network
D: total network cost
$l_i$: link i
$d_i$: cost per unit capacity of $l_i$
$C_i$: capacity of $l_i$
$1/\mu_k$: average packet length of class k
$\gamma_{pq;k}$: mean traffic rate from source node p to destination node q for class k
$\lambda_{i;k}$: traffic rate of link $l_i$ in class k
$\pi_{pq}$: the link set included in path from node p to q
$T_k$: delay constraint representing maximum allowable delay time of class k packet from source node p to destination node q, independent of the distance between nodes
$P_{min}$: predetermined fixed probability value Assumptions:

1. Network topology: the network has m links and n nodes and its topology is given or predetermined.
2. Traffic class: traffic is classified into K classes and each class is given a respective priority based on the maximum allowable delay constraint.
3. Link cost and Network cost: the cost of each link in the network is proportional to the capacity of the link. The total network cost D is the sum of the cost of each link represented by $$D = \sum_{i=1}^{m} d_i C_i. \qquad (2)$$

4. Traffic rate: traffic from source node p to destination node q in each class k follows a Poisson process with a mean traffic rate $\gamma_{pq;k}$.
5. Packet length: packet length for each class k has an exponential distribution with a mean $1/\mu_k$.
6. Routing table: The routing scheme within the network is fixed. This means that all packets belonging to the same traffic class from source node p to destination node q are routed on a fixed path according to the routing table. Thus, the traffic rate for class k on link $l_i$ is represented by $$\lambda_{i;k} = \sum_{p,q \text{ such that } l_i \in \pi_{pq}} \gamma_{pq;k}. \qquad (3)$$

7. Link capacity: each link has a discrete capacity.

Each link $l_i$ in the network can be modeled as an M/M/1 nonpreemptive priority (Head-of-the-Line) queueing system in view of the assumptions 4 and 5 described above, and the known independence assumption described in the above-mentioned Kleinrock text. It will be appreciated that the assumptions 4 and 5 described above are offered to simplify the analysis for assigning the capacity of each link. However, even when the traffic rate distribution and/or the packet length distribution are different from the assumptions 4 and 5, the network design method of the present invention can still be applied using an appropriate conventional analytic solution.

Based on the assumptions described above, a method for assigning the capacity $C_i$ of each link in the network is provided which allows the total network cost D to be minimized subject to the following end-to-end delay distribution constraint.

$$P_{min} \leq P\{X_{pq;k} \leq T_k\} (p,q=1,\ldots,n;k=1,\ldots,K) \qquad (4)$$

where $P_{min}$ is a selected design criteria probability value (e.g., 0.99 or some other value desired for the network) and $P\{X_{pq;k} \leq T_k\}$ is the probability that all packets of class k service grade reach a destination node q from a source node p within a predetermined maximum allowable delay time $T_k$.

Now, the delay distribution $Fx_{pq;k}(t)$ for each traffic class on each path is derived for the purpose of evaluating Equation (4). A path from a source node p to a destination node q consists of a set of links $l_i$ ($i=1,\ldots, L$, $L = \| \pi_{pq} \|$). A random variable for the delay for class k on link $l_i$ is designated by $X_{i;k}$. A random variable for the delay for class k on path $\pi_{pq}$ is designated by $X_{pq;k}$. The distribution functions of $X_{i;k}$ and $X_{pq;k}$ are denoted as $Fx_{i;k}(\cdot)$ and $Fx_{pq;k}(\cdot)$, respectively. $X_{i;k}$ is assumed to be statistically independent, and $X_{pq;k}$ is given by the sum of $X_{i;k}$. Thus, the delay distribution function $Fx_{pq;k}(\cdot)$ can be obtained by convolution of the functions $Fx_{i;k}(\cdot)$ such that:

$$\begin{aligned} Fx_{pq;k}(t) &= P\{X_{pq;k} \leq t\} \\ &\otimes = P\{X_{1;k} + X_{2;k} + \ldots + X_{L;K} \leq t\} \\ &\oplus = P\{X_{1;k} \leq t\} \cdot P\{X_{2;k} \leq t\} \\ &\quad \ldots P\{X_{L;K} \leq t\} \\ &\otimes = Fx_{1;k}(t) \cdot Fx_{2;k}(t) \ldots Fx_{L;k}(t) \end{aligned} \qquad (5)$$

wherein the symbol X represents the convolution operation.

The Laplace transform of Equation (5) is given by $$F^*_{X_{pq;k}}(s) = F^*_{X_{1;k}}(s) F^*_{X_{2;k}}(s) \ldots F^*_{X_{L;k}}(s) \quad (6)$$

where $F^*_{X_{pq;k}}(s)$ and $F^*_{X_{i;k}}(s)$ represent the Laplace transform of distribution functions $Fx_{pq;k}(\cdot)$ and $Fx_{i;k}(\cdot)$, respectively.

Alternatively, by using $f^*x_{i;k}(s)$ for the Laplace transform of the density function for $X_{i;k}$, we have $$F^*_{X_{pq;k}}(s) = \frac{F^*_{X_{1;k}}(s) f^*_{X_{2;k}}(s) \ldots f^*_{X_{L;k}}(s)}{s}. \quad (7)$$

Since the delay for class k on link $l_i$ is composed of the waiting time at the queue and the service time (packet transmission time), we have $$f^*_{X_{i;k}}(s) = w^*_{i;k}(s) b^*_{i;k}(s) \quad (8)$$

where $w^*_{i;k}(s)$ and $b^*_{i;k}(s)$ are the Laplace transform of the waiting time and the service time for traffic class k on link $l_i$, respectively. From the assumption 5 above $b^*_{i;k}(s)$ is given as follows:

$$b^*_{i;k}(s) = \frac{\mu_k C_i}{s + \mu_k C_i} \quad (9)$$

Since we consider the Head-of-the-Line discipline at each queue, $w^*_{i;k}(s)$ is given by Equation (10) below (see the above-mentioned Kleinrock text).

$$\omega^*_{i;k}(s) = \frac{\begin{bmatrix} (1 - \rho_i)[s + \lambda_H - \lambda_H G^*_H(s)] + \\ \lambda_L[1 - b^*_L(s + \lambda_H - \lambda_H G^*_H(s))] \end{bmatrix}}{s - \lambda_{i;k} + \lambda_{i;k} b^*_{i;k}(s + \lambda_H - \lambda_H G^*_H(s))} \quad (10)$$

where, $$\rho_i = \sum_{j=1}^{K} \rho_{ij} = \sum_{j=1}^{K} \frac{\lambda_{ij}}{\mu_j C_i}$$

$$\lambda_H = \sum_{j=1}^{k-1} \lambda_{i;j}, \quad \lambda_L = \sum_{j=k+1}^{K} \lambda_{ij}$$

$$b^*_H(s) = \sum_{j=1}^{k-1} \frac{\lambda_{ij}}{\lambda_H} b^*_{i;j}(s); \quad b^*_L(s) = \sum_{j=k+1}^{K} \frac{\lambda_{ij}}{\lambda_L} b^*_{i;j}(s)$$

$$G^*_H(s) = b^*_H(s + \lambda_H - \lambda_H G^*_H(s))$$

In the case where there are two priority classes, we can simply have $$\omega^*_{i;1}(s) = \frac{(1 - \rho_i)s + \lambda_{i;2}\left[1 - \frac{\mu_2 C_i}{s + \mu_2 C_i}\right]}{s - \lambda_{i;1} + \lambda_{i;1} \frac{\mu_1 C_i}{s + \mu_1 C_i}} \quad (11)$$

and $$\omega^*_{i;2}(s) = \frac{(1 - \rho_i)[s + \lambda_{i;1} - \lambda_{i;1} G^*_H(s)]}{s - \lambda_{i;2} + \lambda_{i;2} \frac{\mu_2 C_i}{s + \lambda_{i;1} - \lambda_{i;1} G^*_H(s) + \mu_2 C_i}} \quad (12)$$

where $$G^*_H(s) = \frac{s + \mu_1 C_i + \lambda_{i;1} - \sqrt{(s + \mu_1 C_i + \lambda_{i;1})^2 - 4\mu_1 C_i \lambda_{i;1}}}{2\lambda_{i;1}}.$$

The above derivation assumes a "strict" independence assumption that the output process from Head-of-the-Line priority queues also follows a Poisson process. Then, Equations (7) through (10) can be used to evaluate Equation (4). For the evaluation of Equation (4), a numerical inversion technique can be used such as, for example, the type provided in the Laplace transform software package called WEEKS. See, Garbow, Giunta, and Lyness, "Software for an Implementation of Weeks' Method for the Inverse Laplace Transform Problem", ACM Transactions on Mathematical Software, vol. 14, pp. 163-170, June 1988; and Garbow, Giunta and Lyness, "A FORTRAN Software Package for the Numerical Inversion of the Laplace transform based on WEEKS' Method," ACM Transactions on Mathematical Software, vol. 14, pp. 171-176, June 1988.

Now, a method for determining the capacity of each link will now be described in accordance with the present invention based on the above derivation. Referring again to FIG. 3, in step S1, the CPU 2 assigns an initial minimum capacity to each link $l_i$ in the network. This is the minimum capacity value required to transfer the traffic through the link $l_i$ by satisfying the capacity on the link $l_i$ as $$C_i > \sum_{k=1}^{K} \frac{\lambda_{i;k}}{\mu_k} \quad (i = 1, \ldots, m). \quad (13)$$

In step S2, the CPU 2 calculates the value of $Fx_{pq;k}(t_k)$ at $t_k = T_k$ for all p, q, k, where $Fx_{pq;k}(t_k)$ is the delay distribution function which defines a relationship between a delay time $t_k$ and a probability that packets of a traffic class k reach a destination node q from a source node p within the delay time $t_k$, and $T_k$ is the predetermined maximum allowable delay time for each traffic class k.

In step S3, the CPU 2 determines the most congested path of a node pair and class, designated as node pair $p_0$-$q_0$ and class $k_0$, which satisfies Equation (14) below.

$$Fx_{p_0 q_0; k_0}(T_{k_0}) = \min_{p,q,k} \{Fx_{pq;k}(T_k)\} \quad (14)$$

where $Fx_{p_0 q_0; k_0}(T_{k_0})$ is equal to a minimum probability value that all packets will reach a destination node of an end-to-end path within a predetermined maximum allowable delay time.

In step S4, the CPU 2 compares the value $P_{min}$ with $Fx_{p_0 q_0; k_0}(T_{k_0})$, where $P_{min}$ is a fixed probability value. If $P_{min} \leq Fx_{p_0 q_0; k_0}(T_{k_0})$, the process of flow chart 15 terminates. If not, the process proceeds to step S5.

In step S5, the CPU 2 calculates a value of $Fx_{i;k_0}(t_k)$ at $t_k = T_{k_0}$ for all links $l_i$ included in the most congested path, where $Fx_{i;k_0}(t_k)$ is a distribution function which defines a relationship between a delay time $t_k$ and a probability that packets of a traffic class $k_0$ are transmitted from a beginning to an end of link $l_i$ within the delay time $t_k$ and $T_{k_0}$ is a predetermined maximum allowable delay time for a traffic class $k_0$.

In step S6, the CPU 2 determines the most congested link $l_{i0}$ in the most congested path of the node pair $P_0$-$q_0$ which satisfies Equation (15) below.

$$F_{Xi0;k0}(T_{k0}) = \min_{l_i \in \pi_{p0q0}} \{F_{Xi;k0}(T_{k0})\} \quad (15)$$

where $F_{Xi0;k0}(T_{k0})$ is equal to a minimum probability value that all packets will reach an end of the link included in the most congested path within a predetermined maximum allowable delay time.

In step S7, the capacity of link $l_{i0}$ is increased and the process returns to step S2.

The amount by which the capacity of link $l_{i0}$ is increased is a function of the desired resolution as will be appreciated. Steps S2 through S7 are repeated until ultimately the conditions of step S4 are satisfied.

EXAMPLE 1

An example which provides comparative results between conventional methods of network design and that of the present invention will now be described with reference to FIG. 2 and Tables 1 through 6. FIG. 2 is representative of a network designed in accordance with the present invention wherein the following values are given (e.g., predetermined by a user and input to the CPU 2).

The number of links m=7, and the number of nodes n=4.

The topology of the network is as shown in FIG. 2.

The routing matrix of the network is as set forth in Table 1.

The number of traffic classes K=1.

Average packet length $1/\mu_1 = 10000$.

The traffic rate matrix between two nodes is set forth in Table 2.

The delay constraint $T_k = T_1 = 3.0$.

The fixed probability $P_{min}$ that all packets do not exceed the delay constraint ($T_1$), is 0.99.

Allowable capacities of respective links are varied from 15000 through 65000 as a multiple of 5000 (e.g., 5000 representing the desired resolution).

Cost per unit capacity $d_i = 1.0$ for all links $l_i$.

TABLE 1

| | Routing Table | | |
|---|---|---|---|
| Path No. | Source | Destination | Link |
| 1 | 1 | 2 | 1 |
| 2 | 1 | 3 | 2 |
| 3 | 1 | 4 | 1,4 |
| 4 | 2 | 1 | 5 |
| 5 | 2 | 3 | 5,2 |
| 6 | 2 | 4 | 4 |
| 7 | 3 | 1 | 3,5 |
| 8 | 3 | 2 | 3 |
| 9 | 3 | 4 | 6 |
| 10 | 4 | 1 | 7,5 |
| 11 | 4 | 2 | 7 |
| 12 | 4 | 3 | 7,5,2 |

TABLE 2

| | | End-to-End Traffic Rate Matrix | | | |
|---|---|---|---|---|---|
| | | \multicolumn{4}{c}{Destination Node} | | | |
| | | 1 | 2 | 3 | 4 |
| Source Node | 1 | | 0.001 | 0.02 | 0.03 |
| | 2 | 0.04 | | 0.03 | 0.01 |
| | 3 | 0.02 | 0.03 | | 0.04 |

TABLE 2-continued

| | End-to-End Traffic Rate Matrix | | | |
|---|---|---|---|---|
| | \multicolumn{4}{c}{Destination Node} | | | |
| | 1 | 2 | 3 | 4 |
| 4 | 0.02 | 0.03 | 0.03 | |

The capacity assignments as determined by the present invention are set forth in the second column of Table 34. The actual probabilities which are derived from the capacity assignments shown in Table 3 are set forth in the second column of Table 4.

The capacity assignments then are used in constructing the links between the respective nodes in the network 10 shown in FIG. 2. The network 10 may be as existing network in which the capacity of the links $l_1$-$l_7$ are adjusted to the capacities given in Table 3, or the network 10 can be newly constructed in accordance with the known topology with links having the capacity assignments given in Table 3. Alternatively, the invention may be used to determine link capacities when adding link(s) to an existing topology or when adding another node(s) and link(s) to an existing topology.

Under the cost assumption of Equation (2), the total cost D of the network is 180000. The capacity assignments as determined by the conventional method described in the above-mentioned Kleinrock text, using the same total cost D of 180000, are set forth in the third column of Table 3.

The following equation gives each capacity $C_i$, which minimizes the network average delay for the given total cost D according to conventional techniques.

$$C_i = \frac{\lambda_i}{\mu_1} + \left(\frac{D_e}{d_i}\right) \frac{\sqrt{\lambda_i d_i}}{\sum_{j=1}^{m} \sqrt{\lambda_j d_j}} \quad (16)$$

where $$D_e = D - \sum_{i=1}^{m} \frac{\lambda_i d_i}{\mu_1}.$$

The results derived from Equation (16) are set forth in the third columns of Table 3 and Table 4 for comparison.

The results as set forth in Table 3 and Table 4 illustrate that the conventionally designed network may be superior in network average delay to the network of the present invention. However, as illustrated by Table 4, the distribution probability value for path 3 does not meet the delay constraint (Equation (4)) as a design criteria for the network designed according to the present invention.

TABLE 3

| Comparison of Capacity Assignments with Same Cost | | |
|---|---|---|
| Link No. | Present Invention | Kleinrock[1] |
| 1 | 25000 | 17960 |
| 2 | 30000 | 29154 |
| 3 | 20000 | 22916 |
| 4 | 25000 | 20450 |
| 5 | 30000 | 38910 |
| 6 | 20000 | 20450 |
| 7 | 30000 | 29154 |
| Ave. Delay | 0.3874 | 0.3771 |

TABLE 4

| Path No. | Probabilities not exceeding $T_k$ from Table 3 | |
|---|---|---|
| | Present Invention | Kleinrock[1] |
| 1 | 0.999392 | 0.994983 |
| 2 | 0.999842 | 0.999797 |
| 3 | 0.994835 | 0.976048 |
| 4 | 0.999811 | 0.999987 |
| 5 | 0.998337 | 0.999211 |
| 6 | 0.999376 | 0.997558 |
| 7 | 0.991351 | 0.997035 |
| 8 | 0.997120 | 0.998799 |
| 9 | 0.997205 | 0.997558 |
| 10 | 0.998337 | 0.999211 |
| 11 | 0.999842 | 0.999797 |
| 12 | 0.992071 | 0.994566 |

EXAMPLE 2

With continuing reference to FIG. 2, the following example illustrates application of the present invention to design of networks for handling multiple traffic classes of information with different priorities.

In this example the following values are given.
Number of traffic classes K=2.
Average packet length, $1/\mu_1 = 1/\mu_2 = 10000$.
Traffic rate is as shown in Table 2.
Delay constraints $T_1 = 2.0$ and $T_2 = 4.0$.
$P_{min} = 0.99$
All other parameters are the same as in the first example.

TABLE 5

| Results of Capacity Assignment with 2 Classes | |
|---|---|
| Link No. | Assigned Capacity |
| 1 | 35000 |
| 2 | 40000 |
| 3 | 30000 |
| 4 | 35000 |
| 5 | 50000 |
| 6 | 25000 |
| 7 | 50000 |

TABLE 6

| Path No. | Path Delay Distribution with 2 Classes | |
|---|---|---|
| | Class 1 | Class 2 |
| 1 | 0.998971 | 0.999999 |
| 2 | 0.999548 | 1.000000 |
| 3 | 0.991764 | 0.999984 |
| 4 | 0.999925 | 0.999999 |
| 5 | 0.997913 | 0.999997 |
| 6 | 0.998936 | 0.999998 |
| 7 | 0.992352 | 0.999972 |
| 8 | 0.997002 | 0.999987 |
| 9 | 0.992140 | 0.999932 |
| 10 | 0.999274 | 0.999998 |
| 11 | 0.999939 | 1.000000 |
| 12 | 0.992654 | 0.999996 |

Table 5 sets forth the link capacity assignments as determined by the method of the present invention. Table 6 sets forth the probability values that packets reach a destination within the delay constraint $T_i (i = 1, 2)$ for each path. In this example, the total network cost is 265000. It is apparent from Table 6 that traffic class 1 is a dominant factor of the total cost.

The above-described approach for assigning the capacity of each link in the network to minimize the total network cost according to the present invention can be summarized as follows:

(a) give a minimum capacity to each link;

(b) find the bottle-neck link (i.e., the most congested link) and raise its capacity; and (c) repeat (b) until the delay distribution constraint (Equation (4)) is satisfied.

Figure 4:
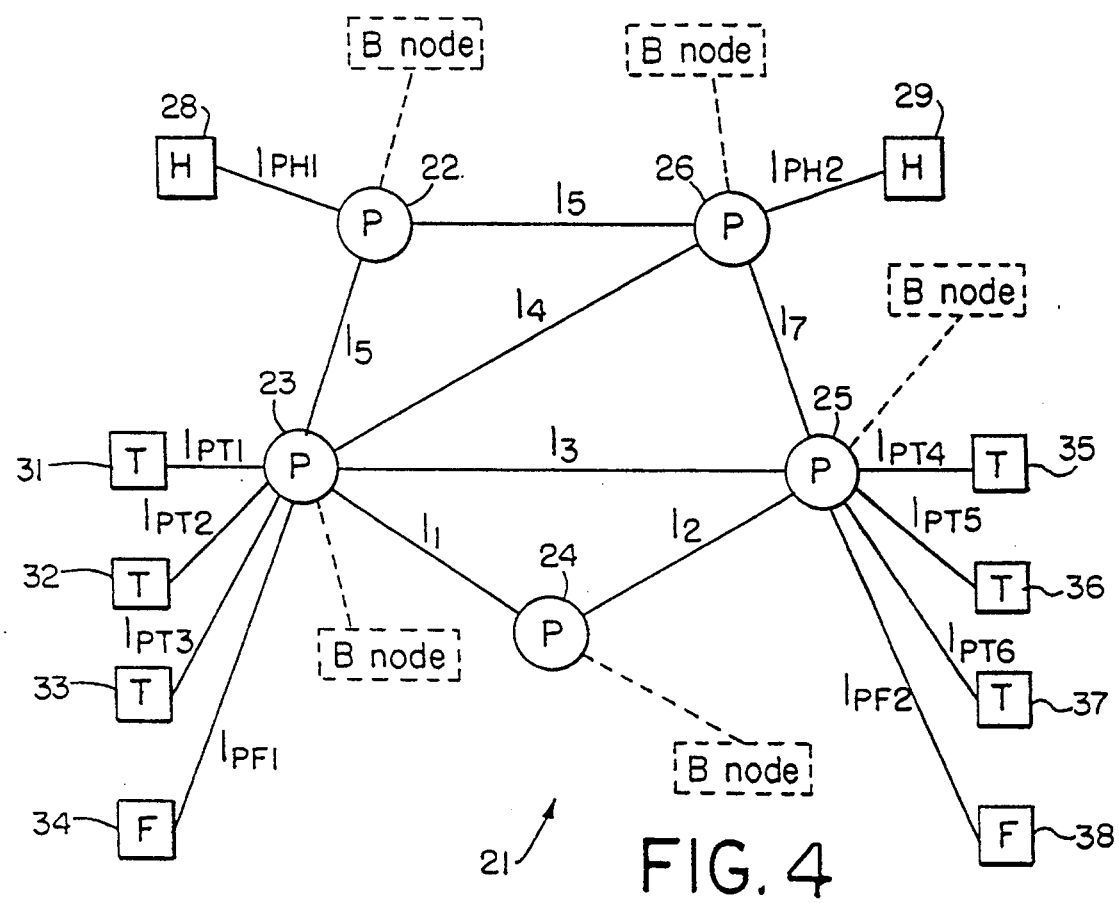
FIG. 4 is a schematic illustration of a multimedia packet-switching communication network according to the present invention.

Referring now to FIG. 4, there is illustrated a packet switching communication network 21 which has five packet switching nodes 22, 23, 24, 25 and 26 interconnected by links $l_1-l_7$. Node 22 is connected to a first host computer 28 by link $l_{PH1}$. Node 26 is connected to a second host computer 29 by link $l_{PH2}$. Terminals 31, 32 and 33, and a Group IV (GIV) facsimile 34 are connected to node 23 by links $l_{PT1}$, $l_{PT2}$, $l_{PT3}$, and $l_{PF1}$, respectively. Terminals 35, 36 and 37, and GIV facsimile 38 are connected to node 25 by links $l_{PT4}$, $l_{PT5}$, $l_{PT6}$, and $l_{PF2}$, respectively. Links l are regarded as "links" of the network, and each of the elements interconnected by links l are regarded as "nodes" of the network as will be appreciated.

The capacities of each link 1 of the network 21, as determined by the above described method, are set to allow end-to-end transmission of different classes of data traffic within a maximum allowable delay time for each class with a given or greater probability. For example, assuming a maximum allowable delay time of two seconds for traffic class 1, and a given probability value of 99%, then a probability that a packet of traffic class 1 will reach host computer 29 from terminal 33 within two seconds is equal to or greater than 99%. Similarly, a probability that a packet of traffic class 1 will reach any destination node form any source node (any end-to-end path) of the network within two seconds is equal to or greater than 99%, regardless of the distance between nodes as, for example, from terminal 31 to terminal 32, from packet switching apparatus 22 to packet switching apparatus 24, and from host computer 28 to GIV facsimile 38.

Accordingly, the present invention provides a method for designing a packet-switching network which handles multimedia traffic with different grades of service. An end-to-end delay distribution is considered as a design constraint instead of the average delay which has been adopted in the conventional design methods. Therefore, all packets in each traffic class for every end-to-end node pair can reach a destination within a predetermined maximum allowable delay with a given or greater probability. This characteristic is suitable to classes of traffic which require low delay variation such as voice or image information.

Moreover, the present invention can be combined with other network design techniques without departing from the scope of the present invention. For example, the method of design can include the step of determining the optimum routing, i.e., flow assignment to each link for each class. It is possible that the different routing for each class according to the delay constraints described above (Equation (4)) will produce an even more cost effective network solution. In addition, it is possible to take into account packet loss probability within the network which represents another important performance measure and could be included as a design constraint as will be described below.

Furthermore, it will be understood that the present invention provides a manner for determining the capacity assignments of links within a network based on end-to-end delay distribution constraints. However, it is possible that a larger or smaller capacity may be used or given in any particular link or links for other reasons, yet this is still contemplated as being within the spirit and scope of the invention.

Figure 5:
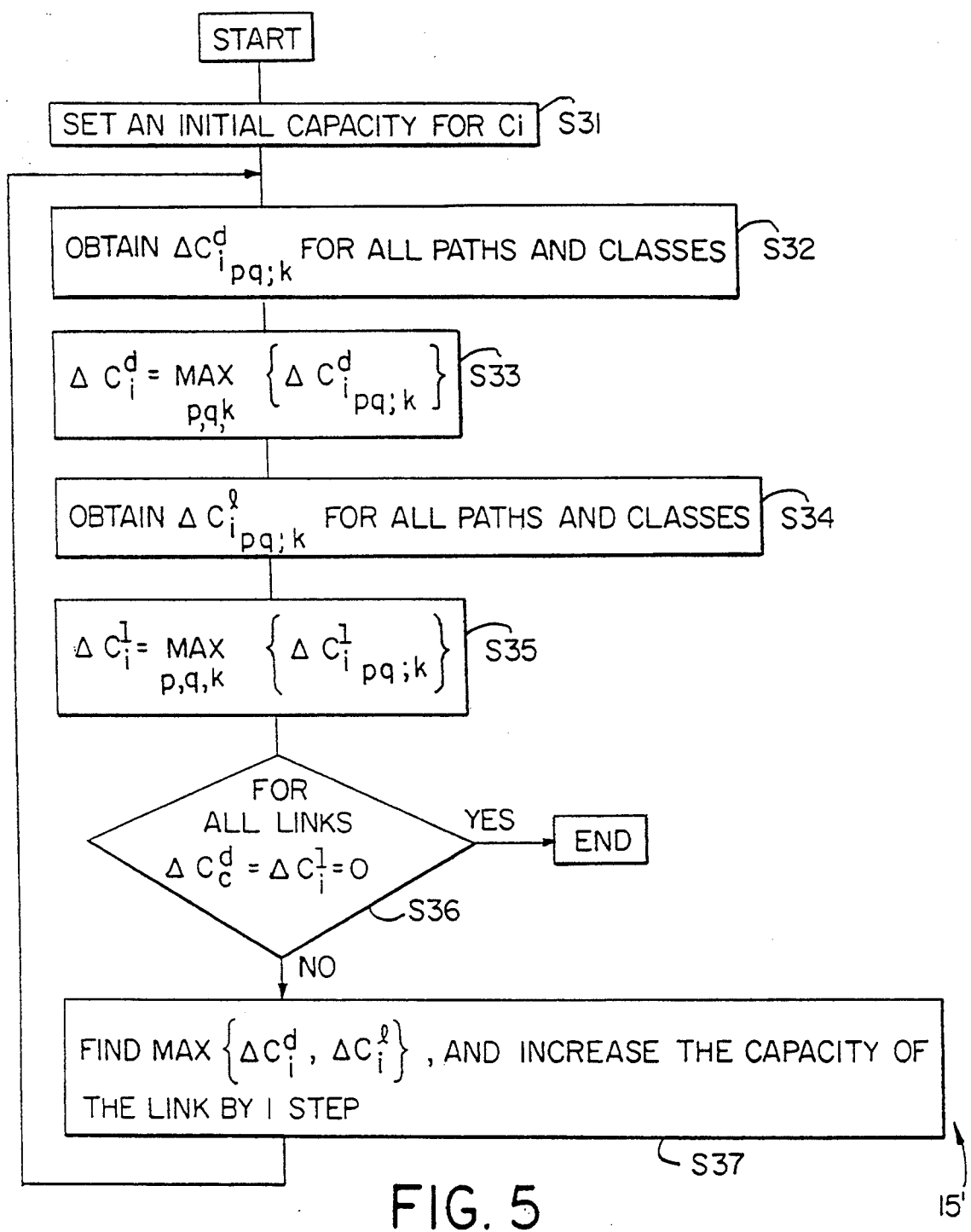
FIG. 5 is a flow chart illustrating steps for determining capacity assignments for network links based on delay distribution and loss probabilities according to the present invention.
Figure 6:
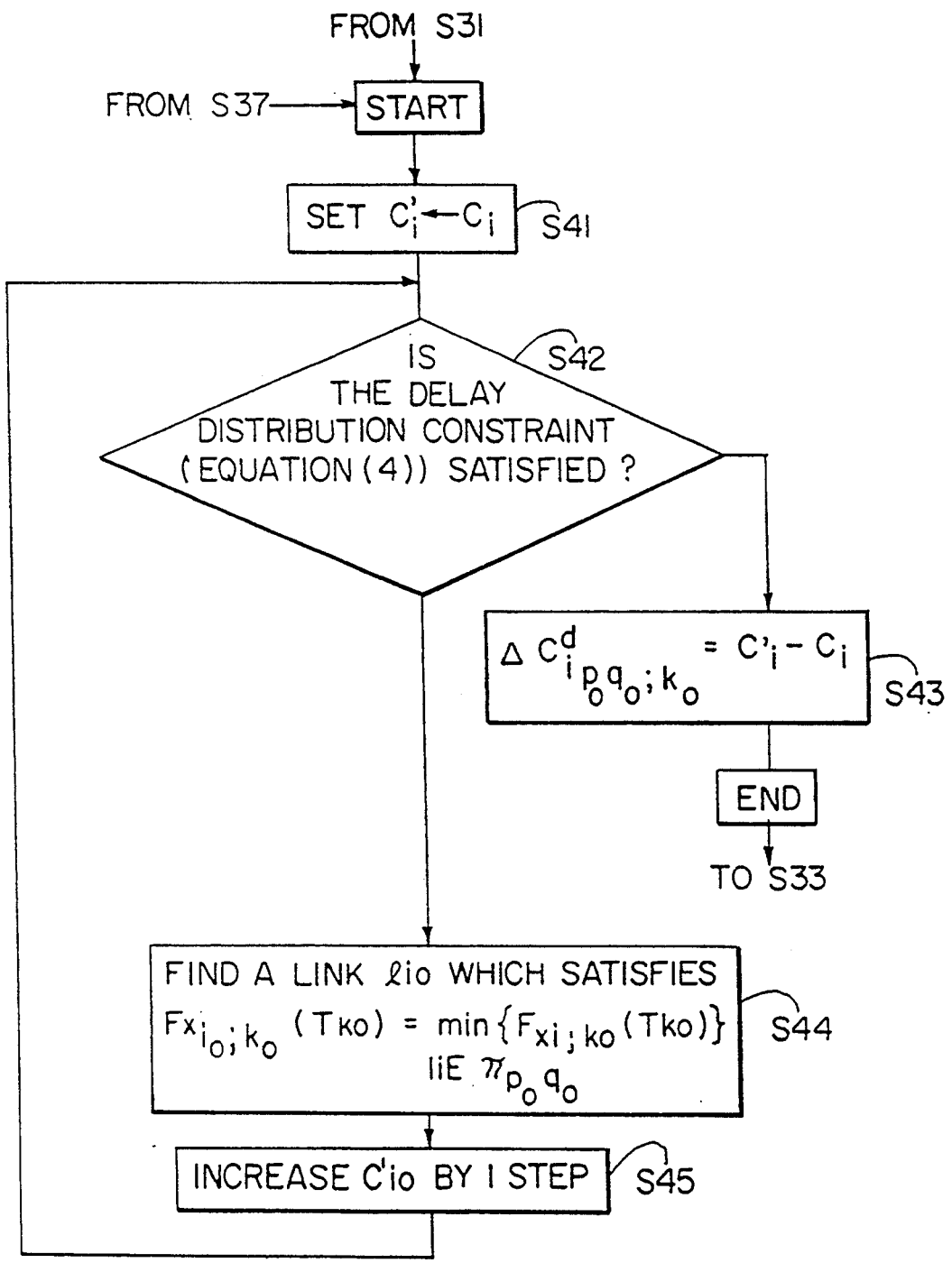
FIG. 6 is a flow chart illustrating steps for obtaining an increment $\Delta C^d_{ipq;k}$ of a link capacity when carrying out the procedure of FIG. 5 according to the present invention.
Figure 7:
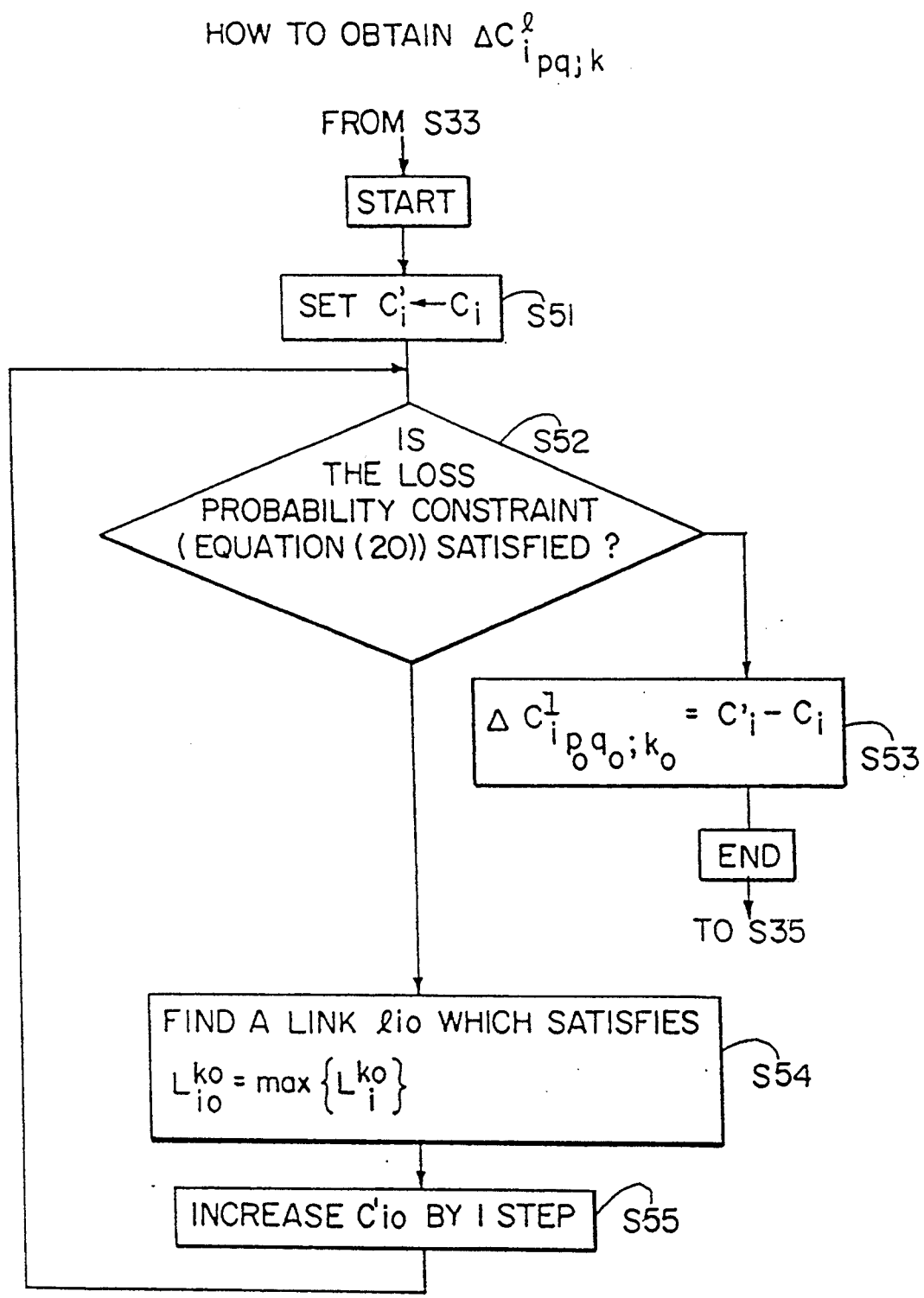
FIG. 7 is a flow chart illustrating steps for obtaining an increment $\Delta C^l_{ipq;k}$ of a link capacity when carrying out the procedure of FIG. 5 according to the present invention.

According to another aspect of the present invention described herein with respect to FIGS. 5 to 7, the apparatus 1 (FIG. 1) is used to determine the capacity assignments of the network 10 (FIG. 2) in view of a maximum loss probability $L_{max;k}$ design criteria in addition to a maximum delay distribution. In this embodiment, again the output of the apparatus 1 makes possible that the maximum allowable delay is identical in each traffic class independent of distance. Moreover, however, a preselected maximum loss probability $L_{mas;k}$ for each class k is provided in the network 10 based on the capacity assignments determined by the apparatus 1. The preselected maximum loss probability $L_{max;k}$ may be different from class to class as will be appreciated.

Referring now specifically to FIG. 5, a flow chart 15' is shown illustrating the process steps carried out by the apparatus 1 in FIG. 1 to perform the method for determining the capacity of each link 1 of the network 10 based on the distribution functions and the loss probabilities as described below. The steps represented in the flow chart 15' may be written in an appropriate computer program language or code by a person who has ordinary skill in the art to operate the apparatus 1 consistent with those steps.

The steps represented in the flow chart 15 are most easily described in view of the notation and assumptions presented above with respect to the flow chart 15, as well as the following notation and assumptions:

Additional notation for network design based on maximum loss probabilities:

$B_k$: buffer length of node buffer Bnode (FIG. 2) for class k in each node;

$L_{max;k}$: maximum value of packet loss probability of class k.

Additional assumptions for network design based on maximum loss probabilities:

8. Packet loss: the maximum buffer length for class k service in each node is represented by $B_k$, and packets or portions thereof which overflow the buffer are lost.

Again, each link $l_i$ in the network can be modeled as an M/M/1 nonpreemptive priority (Head-of-the-Line) queueing system in view of the assumptions 4 and 5 described above, the known independence assumption described in the above-mentioned Kleinrock text, and further in view of assumption 8 relating to the maximum buffer length.

Based on the assumptions described above, a method for assigning the capacity $C_i$ of each link in the network is provided which allows the total network cost D to be minimized subject to the above described end-to-end delay distribution constraint (Equation (4)) and the following packet loss probability constraint (Equation (20)).

$$L_{max;k} \geq L_{pq;k} \quad (p,q=1,\ldots,n; k=1,\ldots,K) \quad (20)$$

where $L_{max;k}$ is a design criteria probability value for each traffic class k and $L_{pq;k}$ is a probability that packets in a traffic class k from a source node p to a destination node q are lost.

The delay distribution $Fx_{pq;k}(t)$ for each traffic class on each path is derived as is described above for the purpose of evaluating Equation (4) for the delay distribution constraint. As a result, such derivation will not be repeated.

The packet loss probability for each class on each path is derived for the purpose of evaluating Equation (20) for the loss probability constraint. Each link $l_i$ in the network is modeled as an M/M/1 nonpreemptive priority queueing system. When the usage rate of a class k packet of information on a certain link $l_i$ is assumed to be $\rho_{i;k}$, and the maximum buffer length of the class k is $B_k$, the loss probability $L_{i;k}$ for the class k packet of information on the link $l_i$ can be expressed as follows (see also the above-mentioned Kleinrock text):

$$L_{i;k} = \frac{(1 - \rho_{i;k})\rho_{i;k}^{B_k}}{1 - \rho_{i;k}^{B_k+1}} \quad (21)$$

If the packets belonging to the class k are assumed to be processed only when packets belonging to another class which has a higher priority than the class k are not processed, $\rho_{i;k}$ can be approximated as in Equation (22) shown below. See S. C. Agrawal "Meta-modeling: A study of Approximations in Queueing Models", The MIT Press, Massachusetts (1985).

$$\rho_{i;k} = \frac{\lambda_{i;k}}{\mu_k C_i(1 - \sigma_{i;k-1})}; \quad (22)$$

where $$\sigma_{i;k-1} = \sum_{j=1}^{k-1} \frac{\lambda_{i;j}}{\mu_j C_i}$$

If $L_{i;k}$ is assumed to be a very small value, the packet loss probability on a path $\pi_{pq}$ can be approximated as a sum of the loss probabilities on the links included in the path $\pi_{pq}$, as expressed by Equation (23):

$$L_{pq;k} = \sum_{i: l_i \in \pi_{pq}} L_{i;k} \quad (23)$$

Referring back to FIG. 5, the method for determining the capacity of each link 1 of the network 10, based on the distribution functions and the loss probabilities is now described.

In step S31, the CPU 2 assigns an initial capacity $C_i$ to each link $l_i$ in the network. This is the minimum capacity value required to transfer the traffic through the link $l_i$ by satisfying the capacity on the link $l_i$ as $$C_i > \sum_{k=1}^{K} \frac{\lambda_{i;k}}{\mu_k} \quad (i = 1, \ldots, m). \quad (24)$$

In step S32, the CPU 2 calculates the value of $\Delta C^d_{ipq;k}$ for each link for all paths and classes, where $\Delta C^d_{ipq;k}$ is a increment for the capacity $C_i$ of each link $l_i$ included in the path $\pi_{pq}$ required for satisfying the delay distribution constraint (Equation (4)). More particularly, $\Delta C^d_{ipq;k}$ represents an amount by which if the substitution expressed by Equation (25) were performed and the capacities $C_i$ obtained by the substitution were assigned to the respective links $l_i$ included in the path $\pi_{pq}$, the path $\pi_{pq}$ would satisfy the delay distribution constraint (Equation (4)) for the class k.

$$C_i \leftarrow C_i + \Delta C_{ipq;k}{}^d \quad (i: l_i \in \pi_{pq}) \quad (25)$$

In a case where the delay distribution constraint (Equation (4)) has been satisfied $\Delta C^d_{ipq;k}=0$. Further details on how to obtain $\Delta C^d_{ipq;k}$ will be provided below with reference to FIG. 6.

In step S33, the CPU 2 determines which is the largest one of $\Delta C^d_i$ for each link $l_i$ and designates it as $\Delta C^d_i$ as defined by Equation (26).

$$\Delta C^d_i = \max_{p,q,k} \{\Delta C^d_{ipq;k}\} \tag{26}$$

In step S34 the CPU 2 calculates $\Delta C^l_{ipq;k}$ for each link for all paths and classes, where $\Delta C^l_{ipq;k}$ is an increment for the capacity $C_i$ of each link $l_i$ included in the path $\pi_{pq}$ required for satisfying the loss probability constraint (Equation (20)). More particularly, $\Delta C^l_{ipq;k}$ represents an amount by which if the substitution expressed by Equation (27) were performed and the capacities $C_i$ obtained by the substitution were assigned to the respective links $l_i$ included in the path $\pi_{pq}$, the path $\pi_{pq}$ would satisfy the loss probability constraint (Equation (20)) for the class k.

$$C_i \leftarrow C_i + \Delta C_{ipq;k}^l \ (i: l_i \in \pi_{pq}) \tag{27}$$

In a case where the loss probability constraint (Equation (20)) has been satisfied, $\Delta C^l_{ipq;k}=0$. The manner in which it is possible to obtain $\Delta C^l_{ipq;k}$ will be described in detail below with respect to FIG. 7.

In step S35, the CPU 2 determines which is the largest one of $\Delta C^l_{ipq;k}$ for each link $l_i$ and designates it as $\Delta C^l_i$ as defined by Equation 28.

$$\Delta C^l_i = \max_{p,q,k} \{\Delta C^d_{ipq;k}\} \tag{28}$$

In step S36, the CPU 2 judges whether or not a condition of $\Delta C^d_i = \Delta C^l_i = 0$ is satisfied for all links $l_i$. The above condition means that both the delay distribution constraint (Equation (4)) and the loss probability constraint (Equation (20)) are satisfied for all the paths and classes. Accordingly, if the judged result in step S36 is Yes, the process represented in the flow chart 15' is terminated. The capacity assignments represented by the current values of $C_i$ for each link are then output by the CPU 2 and the network 10 can be configured based on such capacity assignments. If the condition of step S36 is not satisfied, the process proceeds to step S37.

In step S37, the CPU 2 determines the largest one among the increments $\Delta C^d_i$ and $\Delta C^l_i$ obtained in steps S33 and S35, and increases the capacity of the link $l_i$ corresponding to the largest increment by a step. In other words, in view of the design criteria of delay distribution and loss probability, a link whose capacity is required to increase the most is specified, and the capacity of the specified link is increased by 1 step. The magnitude of such increase is selectable by the user and/or the CPU 2 and is directly related to the desired resolution for the network design as will be appreciated. Following step S37, the process returns to step S32.

Referring to FIG. 6, an exemplary method for obtaining $\Delta C^d_{ipq;k}$ in step S32 is described. As an example, an increment $\Delta C^d_{ip_0q_0;k_0}$ for a class $k_0$ on a certain path $\pi_{p_0q_0}$ is to be obtained, and the path $\pi_{p_0q_0}$ include links $l_i$ where $l_i \in \pi_{p_0q_0}$.

In step S41, the CPU 2 sets a provisional capacity $C'_i$ for each link $l_i$ in the path $\pi_{p_0q_0}$ for the purpose of calculation. More specifically, the CPU 2 sets the values of dummy variables $C'_i$ to the current value of the corresponding $C_i$ for each link $l_i$ in the path $\pi_{p_0q_0}$. The current value of $C_i$ is the value of $C_i$ for each particular link at that particular time in the system flow chart 15' as will be appreciated.

In step S42, the CPU 2 determines whether or not the delay distribution constraint (Equation (4)) is satisfied for the class $k_0$ on the path $\pi_{p_0q_0}$ using, for example, the techniques described above. If the constraint is satisfied, the CPU 2 compares the provisional capacity $C'_i$ with the corresponding capacity $C_i$ for each link $l_i$ in the path $\pi_{p_0q_0}$ so as to get a difference $\Delta C^d_{ip_0q_0;k_0}$ (step S43). The process is then terminated and the system operation returns to step S33. If the constraint is not satisfied in step S42, the CPU 2 finds in step S44, among the links $l_i$ included in the path $\pi_{p_0q_0}$, a link designated $l_{i0}$ having the minimum distribution function value $Fx_{i;k0}(T_{k0})$ in $T_{k0}$ which is expressed as follows:

$$Fx_{i0;k0}(T_{k0}) = \min_{l_i \in \pi_{p_0q_0}} \{F_{Xi;k0}(T_{k0})\} \tag{29}$$

The link $l_{i0}$ is regarded as the most congested link (a bottle-neck link) among the links $l_i$ included in particular the path $\pi_{p_0q_0}$.

In step S45, the provisional capacity $C'_{i0}$ for the link $l_{i0}$ obtained in step S44 is increased by a step, and the process returns to step S42. As in step S37, the amount of the incremental increase is step S45 can be a predetermined amount selected by the user or the CPU 2. Again the selected amount will be a function of the desired resolution.

It will be appreciated that the above procedure described with respect to FIG. 6 is repeated for all paths and classes. As a result, the values identified in step S32 of FIG. 5 can be obtained.

Referring now to FIG. 7, an exemplary manner for obtaining $\Delta C^l_{ipq;k}$ in step S34 of the flow chart 15' is described. As an example, an increment $\Delta C^l_{ip_0q_0;k_0}$ for a class $k_0$ on a certain path $\pi_{p_0q_0}$ is to be obtained, and the path $\pi_{p_0q_0}$ includes links $l_i$ where $l_i \in \pi_{p_0q_0}$.

In step S51, the CPU 2 sets a provisional capacity $C'_i$ for each link $l_i$ in the path $\pi_{p_0q_0}$ for the purpose of calculation. As in step S41, the CPU 2 sets the provisional value of $C'_i$ to the corresponding current value $C_i$ at that particular point in the flow chart 15'.

In step S52, the CPU 2 determines whether or not the loss probability constraint (Equation (20)) is satisfied for the class $k_0$ on the path $\pi_{p_0q_0}$. If the loss probability constraint is satisfied, the CPU 2 compares the provisional capacity $C'_i$ from step S51 with the capacity $C_i$ for each link $l_i$ in the path $\pi_{p_0q_0}$ so as to get a difference $\Delta C^l_{ip_0q_0;k_0}$ (step S53). The process is then terminated and the system operation returns to step S31 in the flow chart 15'. If the constraint is not satisfied in step S52, the CPU 2 finds in step S54, among the links included in the path $\pi_{p_0q_0}$, a link designated $l_{i0}$ having the maximum loss probability value in the class $k_0$ which is expressed as follows:

$$L_{i0;k0} = \max_{l_i \in \pi_{p_0q_0}} \{L_{i;k0}\} \tag{30}$$

In step S55 the provisional capacity $C'_{i0}$ for the link $l_{i0}$ obtained in step S54 is increased by a step, and the process returns to step S52.

Again, it will be appreciated that the above described process with respect to FIG. 7 is carried out by the CPU 2 for all paths and classes. As a result, the values identified in step S34 in the flow chart 15' are obtained.

EXAMPLE 3

A description of an example illustrating comparative results between conventional methods of network design and that of the present invention is provided with reference to FIG. 2 and Tables 7 through 16. FIG. 2 is again representative of a network 10 designed by the method of the present invention wherein the following values are initially given (e.g., predetermined).

Regarding the network 10:

The number of links m=7, and the number of nodes n=4. The topology of the network is as shown in FIG. 2. The routing matrix of the network is set forth in Table 7 (which is identical to Table 1 presented in a previous example).

The buffer length $B_1=100$ for each buffer $B_{node}$.

The allowable capacity of each link is a multiple of 1.5 million bits per second (Mbps).

Cost per 1 Mbps is 1.0 for all links.

Regarding traffic:

The number of traffic classes K=1.

Average packet length $1/\mu_1=10000$ bits. The traffic rate matrix between two nodes is as set forth in Table 8. Traffic rate values in Table 8 are larger than those in Table 2. This is because, in Example 3, we have adopted assumptions different from those in Example 1 in order to establish a network model which is closer to an actual network. However, such a difference is not essential to the method of the present invention.

Regarding the demands of grade of traffic:

The maximum allowable delay $T_1=50$ msec. $P_{min}$ is 0.99. That is, it is desired that packets can reach any destination node within 50 msec with a probability of 99%.

The maximum loss probability of packets $L_{max;1}=10^{-6}$.

TABLE 7

| | Routing Table | | |
|---|---|---|---|
| Path No. | Source | Destination | Link |
| 1 | 1 | 2 | 1 |
| 2 | 1 | 3 | 2 |
| 3 | 1 | 4 | 1,4 |
| 4 | 2 | 1 | 5 |
| 5 | 2 | 3 | 5,2 |
| 6 | 2 | 4 | 4 |
| 7 | 3 | 1 | 3,5 |
| 8 | 3 | 2 | 3 |
| 9 | 3 | 4 | 6 |
| 10 | 4 | 1 | 7,5 |
| 11 | 4 | 2 | 7 |
| 12 | 4 | 3 | 7,5,2 |

TABLE 8

| | | End-to-End Traffic Rate Matrix | | | |
|---|---|---|---|---|---|
| | | Destination Node | | | |
| | | 1 | 2 | 3 | 4 |
| Source Node | 1 | | 100 | 400 | 200 |
| | 2 | 800 | | 600 | 100 |
| | 3 | 400 | 600 | | 800 |

TABLE 8-continued

| | End-to-End Traffic Rate Matrix | | | |
|---|---|---|---|---|
| | Destination Node | | | |
| | 1 | 2 | 3 | 4 |
| 4 | 400 | 600 | 600 | |

The capacity assignments of the respective links as determined by applying the method represented by flow chart 15' to the example above are set forth in the second column of Table 9. The unit used for representing the capacity is Mbps. For comparison, the capacity assignments as determined by the conventional method described in the above-mentioned Kleinrock text, in order to result in the same average delay of the network obtained according to the invention, are set forth in the third column of Table 9. The following equation is used for determining the capacity assignments according to the conventional method.

$$C_i = \frac{\lambda_{i;1}}{\mu_1} + \frac{\sum_{j=1}^{m}\sqrt{\frac{d_j\lambda_{j;1}}{\mu_1}}}{\gamma T_{max}}\sqrt{\frac{\lambda_{i;1}}{d_i\mu_1}} \quad (31)$$

$(i = 1, \ldots, m)$

In the above Equation (31), $T_{max}$ is a maximum value of the average packet transmission delay. The results as set forth in Table 9 illustrate that, if the same average delay is used, the method according to Kleinrock can construct a network with a slightly lower cost as compared with the present invention.

However, the delay distribution and the loss probability obtained using the above-assigned capacities are set forth in Table 10. In this example, the delay distribution is represented in Table 10 as the delay time on the respective path for the given class of traffic whereby there is at least the desired probability $P_{min}$ (e.g., 99%) that the information will reach its distinction by such delay time.

According to the invention, the delay distributions and the loss probabilities satisfy the constraints for all the paths. On the other hand, according to the method of Kleinrock, on some paths, the constraints are not satisfied. The specific path distributions and probabilities which do not meet desired design criteria are underlined in Table 10.

According to the method of the present invention, for example, the capacity assigned to the link No. 5 is larger than that in the method of Kleinrock (Table 9). Accordingly, in the method of the present invention, for all the paths including the link No. 5 (e.g., the paths Nos. 4, 5, 7, 10 and 12), the loss probability constraint is satisfied. In the method of Kleinrock, the loss probability constraint is not satisfied for the paths including the link No. 5. This is because according to the method of the present invention, the capacities of the links are assigned so as to satisfy the demands of grade of service for each path. Thus, according to the present invention, a network which meets the delay distribution and the loss probability constraints can be designed and constructed while the total network cost is only slightly little higher as compared with the conventional method of Kleinrock.

The capacity assignments set forth in the second column of Table 9 then may be, and preferably are, used in the constructing of the actual links between the respective nodes in the network 10 shown in FIG. 2. The network 10 may be as existing network in which the capacity of the links $l_1$-$l_7$ are adjusted to the capacities given in Table 9, or the network 10 can be newly constructed in accordance with the known topology with links having the capacity assignments given in Table 9. Alternatively, the present invention may be used to determine link capacities when adding link(s) to an existing topology or when adding another node(s) and link(s) to an existing topology.

TABLE 9

Comparison of Capacity Assignments

| Link No. | Present Invention | Kleinrock |
|---|---|---|
| 1 | 4.5 | 4.12 |
| 2 | 19.5 | 18.59 |
| 3 | 12.0 | 12.05 |
| 4 | 4.5 | 4.12 |
| 5 | 33.0 | 31.42 |
| 6 | 9.0 | 9.83 |
| 7 | 18.0 | 18.59 |
| Ave. Delay (msec) | 4.187 | 4.187 |
| Total Cost | 100.5 | 98.71 |

TABLE 10

99% Delay and Loss Probability

| | 99% Delay (msec) | | Loss Probability | |
|---|---|---|---|---|
| Path No. | Present Invention | Kleinrock | Present Invention | Kleinrock |
| 1 | 30.7 | 41.1 | 8.20e-19 | 4.52e-15 |
| 2 | 13.1 | 17.8 | 4.80e-10 | 4.31e-08 |
| 3 | 44.3 | 59.3 | 1.64e-18 | 9.03e-15 |
| 4 | 9.2 | 13.4 | 1.11e-08 | 1.07e-06 |
| 5 | 16.4 | 22.8 | 1.15e-08 | 1.11e-06 |
| 6 | 30.7 | 41.1 | 8.20e-19 | 4.52e-15 |
| 7 | 25.6 | 26.9 | 1.31e-09 | 1.07e-06 |
| 8 | 23.0 | 22.5 | 2.01e-08 | 1.41e-09 |
| 9 | 46.1 | 25.2 | 8.52e-07 | 2.12e-10 |
| 10 | 25.8 | 22.8 | 8.63e-07 | 1.11e-06 |
| 11 | 23.0 | 17.8 | 8.52e-07 | 4.31e-08 |
| 12 | 29.6 | 30.1 | 8.64e-07 | 1.16e-06 |

With continuing reference to FIG. 2, the following examples illustrate further applications of the present invention to design networks for handling multiple traffic classes of information with different priorities.

EXAMPLE 4

A network is desired where the delay distribution constraints for different classes of traffic are the same but the loss probability constraints are different.

For example, voice and image information may have substantially the same demand for grade of service with respect to delay distribution, but may have different demands for grade of service with respect to loss probability. The present invention can be utilized to design a network which meets the desired criteria as will now be described.

In this example the following values are given and can be input into the CPU 2.

Number of traffic classes K=2.
Buffer length for each class is 30.
Maximum allowable delay $T_1 = T_2 = 50$ msec.
Loss probability for class 1 (e.g., voice information) is $L_{max;1} = 10^{-9}$ and loss probability for class 2 (e.g., image information) is $L_{max;2} = 10^{-3}$.

All other given parameters are the same as in the above example 3.

TABLE 11

Capacity Assignments

| Link No. | Capacity |
|---|---|
| 1 | 9.0 |
| 2 | 36.0 |
| 3 | 22.5 |
| 4 | 9.0 |
| 5 | 63.0 |
| 6 | 18.0 |
| 7 | 36.5 |
| Total cost | 193.5 |

TABLE 12

99% Delay and Loss Probability

| | 99% Delay (msec) | | Loss Probability | |
|---|---|---|---|---|
| Path No. | Class 1 | Class 2 | Class 1 | Class 2 |
| 1 | 8.7 | 25.6 | 3.2380e-15 | 4.6586e-10 |
| 2 | 2.3 | 22.2 | 1.5110e-11 | 2.4783e-04 |
| 3 | 12.9 | 35.7 | 6.4759e-15 | 9.3132e-10 |
| 4 | 1.7 | 12.1 | 1.5110e-11 | 2.4783e-04 |
| 5 | 3.3 | 26.0 | 3.0219e-11 | 4.9587e-04 |
| 6 | 8.7 | 25.6 | 3.2380e-15 | 4.6586e-10 |
| 7 | 4.4 | 38.3 | 3.0219e-11 | 4.9567e-04 |
| 8 | 3.9 | 35.6 | 1.5110e-11 | 2.4783e-04 |
| 9 | 4.9 | 44.1 | 1.5110e-11 | 2.4783e-04 |
| 10 | 3.3 | 26.0 | 3.0219e-11 | 4.9567e-04 |
| 11 | 2.3 | 22.2 | 1.5110e-11 | 2.4783e-04 |
| 12 | 4.5 | 34.8 | 4.5329e-11 | 7.4350e-04 |

Table 11 sets forth the link capacity assignments as determined using the method represented by the flow chart 15'. Table 12 sets forth the delay distribution and the loss probability for each path associated with the link capacities assigned as in Table 11.

As seen from Table 12, the delay distributions and the loss probabilities are within the constraints for all paths and classes. In this example, the loss probabilities are closer to the respective constraint than the delay distributions, so that the loss probability may be regarded as a main factor when the capacity assignment is determined.

EXAMPLE 5

As yet another example, a network is desired where the delay distribution constraints are different for different classes of traffic, but the loss probability constraints are the same.

For example, image and data may have different demands for grade of service with respect delay distribution, but may have substantially the same demand for grade of service with respect to loss probability. An application of the present invention to such a case is now described.

In this example the following values are given.
Number of traffic classes K=2.
Buffer length for each class is 50.
Maximum allowable delay for class 1: $T_1 = 50$ msec, and maximum allowable delay for class 2: $T_2 = 200$ msec.
Loss probability $L_{max;1} = L_{max;2} = 10^{-9}$.

All other parameters are the same as in the above Example 3.

TABLE 13

Capacity Assignments

| Link No. | Capacity |
|---|---|
| 1 | 9.0 |
| 2 | 40.5 |
| 3 | 25.5 |

TABLE 13-continued

| Capacity Assignments | |
|---|---|
| Link No. | Capacity |
| 4 | 7.5 |
| 5 | 70.5 |
| 6 | 21.0 |
| 7 | 40.5 |
| Total Cost | 214.5 |

TABLE 14

| | 99% Delay and Loss Probability | | | |
|---|---|---|---|---|
| | 99% Delay (msec) | | Loss Probability | |
| Path No. | Class 1 | Class 2 | Class 1 | Class 2 |
| 1 | 8.7 | 25.6 | 9.2884e-25 | 4.4409e-16 |
| 2 | 2.0 | 9.6 | 4.1206e-21 | 1.9407e-10 |
| 3 | 15.5 | 62.3 | 7.6068e-21 | 5.2278e-10 |
| 4 | 1.6 | 7.4 | 5.3536e-21 | 2.9610e-10 |
| 5 | 2.6 | 12.1 | 9.4742e-21 | 4.9016e-10 |
| 6 | 12.3 | 56.1 | 7.6059e-21 | 5.2278e-10 |
| 7 | 3.7 | 16.2 | 8.2163e-21 | 4.0410e-10 |
| 8 | 3.0 | 15.2 | 2.8627e-21 | 1.0801e-10 |
| 9 | 3.7 | 16.9 | 6.8432e-22 | 1.1024e-11 |
| 10 | 2.6 | 12.1 | 9.4742e-21 | 4.9016e-10 |
| 11 | 2.0 | 9.6 | 4.1206e-21 | 1.9407e-10 |
| 12 | 3.9 | 15.4 | 1.3595e-20 | 6.8423e-10 |

Table 13 sets forth the link capacity assignments as determined according to the present invention. Table 14 sets forth the delay distribution and the loss probability for each path associated the link capacities assigned as in Table 7.

As is seen from Table 14, the delay distributions and the loss probabilities satisfy the constraints for all paths and classes. In this example, the loss probability for class 2 can be regarded as a main factor when the capacity assignment is determined. The maximum value of the loss probability is $10^{-9}$, but the loss probability values of class 1 are much lower than the maximum value. This is because the buffer lengths for the class 1 and the class 2 are assumed to be the same length.

EXAMPLE 6

In still another example, a network is desired where the delay distribution constraints are different for different classes of traffic and the loss probability constraints are also different:

For example, voice typically requires a "strict" constraint for delay distribution, but has a "generous" constraint for loss probability. On the contrary, data used in a computer or the like has a more "generous" constraint for delay distribution, but has a "strict" constraint for loss probability. Thus, an application of the present invention to such a case where the "strict" and "generous" constraints for two classes are reversed is now described.

In this example the following values are given.
Number of traffic classes $K=2$.
Buffer length for each class is 70.
Maximum allowable delay for class 1: $T_1 = 10$ msec and maximum allowable delay for class 2: $T_2 = 200$ msec.
Loss probability for class 1 is $L_{max;1} = 10^{-3}$ and loss probability for class 2 is $L_{max;2} = 10^{-9}$.

All other parameters are the same as in the above Example 3.

TABLE 15

| Capacity Assignments | |
|---|---|
| Link No. | Capacity |
| 1 | 12.0 |
| 2 | 48.0 |
| 3 | 24.0 |
| 4 | 10.5 |
| 5 | 66.0 |
| 6 | 19.5 |
| 7 | 48.0 |
| Total Cost | 228.0 |

TABLE 16

| | 99% Delay and Loss Probability | | | |
|---|---|---|---|---|
| | 99% Delay (msec) | | Loss Probability | |
| Path No. | Class 1 | Class 2 | Class 1 | Class 2 |
| 1 | 5.7 | 10.7 | 5.3810e-43 | 2.6833e-34 |
| 2 | 1.7 | 7.6 | 2.6633e-34 | 4.2352e-22 |
| 3 | 9.1 | 18.5 | 5.8769e-39 | 8.3628e-29 |
| 4 | 1.6 | 8.8 | 4.9343e-27 | 1.3691e-10 |
| 5 | 2.3 | 10.4 | 4.9343e-27 | 1.3691e-10 |
| 6 | 6.7 | 15.7 | 5.8764e-39 | 8.3628e-29 |
| 7 | 4.1 | 23.7 | 6.3505e-27 | 1.5377e-10 |
| 8 | 3.4 | 21.7 | 1.4162e-27 | 1.6864e-11 |
| 9 | 4.3 | 24.2 | 4.8366e-28 | 2.8237e-12 |
| 10 | 2.3 | 10.4 | 4.9343e-27 | 1.3691e-10 |
| 11 | 1.7 | 7.8 | 2.6633e-34 | 4.2352e-22 |
| 12 | 3.4 | 12.3 | 4.9343e-27 | 1.3691e-10 |

Table 15 sets forth the link capacity assignments as determined according to the flow chart 15'. Table 16 sets forth the delay distribution and the loss probability for each path associated with the link capacities assigned as in Table 15.

As is seen from Table 16, the delay distributions and loss probabilities satisfy the constraints for all paths and classes. In this example, as to delay distribution, class 2 is dominant and as to loss probability, class 1 is dominant. Therefore, the delay distribution values of class 2 and the loss probability values of class 1 are much lower than the constraints. This is because for routing, packets of all classes are assumed to be transmitted on the same path irrespective of the traffic classes, and because a priority queueing system in which a more strict delay distribution constraint has a higher priority is assumed to be adopted for each node.

The above-described approach for assigning the capacity of each link in the network according to the present invention can be summarized as follows:

(a) give a minimum capacity to each link;
(b) find the link whose capacity is most required to be increased (i.e., the bottle-neck link) using the delay distribution and loss probability constraints and increase its capacity; and
(c) repeat (b) until the constraints are satisfied.

In conclusion, the present invention provides a method for designing a packet-switching network which handles multimedia traffic with different grades of service. An end-to-end delay distribution and a loss probability are considered as design constraints instead of the "average" delay which has been adopted in conventional design methods. Therefore, all packets in each traffic class on every end-to-end node pair can reach a destination within a predetermined maximum allowable delay with a given or greater probability, and the loss probability values can be equal to or smaller than the maximum value determined for each class. Thus, it is possible to design a higher quality network as compared to conventional designs.

Moreover, the present invention can be combined with other network design techniques without departing from the scope of the present invention. For example, the method of design can include the step of determining the optimum routing, i.e., flow assignment to each link for each class. It is possible that the different routing for each class according to the constraints described above (Equations (4) and (20)) will produce an even more cost effective network solution.

Furthermore, it will be understood that the present invention provides manner for determining the capacity assignments of links within a network based on end-to-end delay distribution and loss probability constraints. However, it is possible that a larger or smaller capacity may be used or given in any particular link or links for other reasons, yet this is still contemplated within the spirit and scope of the invention.

According to the present invention, packets in each traffic class can reach a destination node from a source node within a predetermined maximum allowable delay with a given or greater probability. As a result, the packet transmission delays are substantially the same independent of the distance between the nodes, and the variation in delay is small. Moreover, the packet loss probability can be suppressed to a predetermined allowable value or smaller. Therefore, it is possible to provide a packet switching network suitable for multimedia information transmission.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for designing a packet-switching communication network having at least two nodes and at least one link from node-to-node for transmitting packets, the method comprising the steps of:
   (1) setting an initial capacity for each link of said network;
   (2) determining a most congested link based on delay distribution functions, each delay distribution function defining a relationship between a delay time and a probability that packets reach a destination node from a source node within said delay time;
   (3) modifying the capacity of said most congested link; and
   (4) repeating steps 2 and 3 until the value of each distribution function at a predetermined maximum allowable delay time is equal to or greater than a selected probability value for all paths from source nodes to destination nodes, resulting in a network which allows all packets to reach a destination node from a source node within said predetermined maximum allowable delay time with said selected probability value or greater probability value.

2. The method of claim 1, wherein said distribution functions are determined for all traffic classes of said packets, whereby packets of all traffic classes reach said destination nodes from said source nodes within said predetermined maximum allowable delay time with said selected probability value or greater probability value.

3. The method of claim 2, wherein said predetermined maximum allowable delay time is set for each traffic class.

4. A packet-switching communication network designed in accordance with the method of claim 1.

5. A method for assigning capacities to a plurality of links of a network which has a plurality of paths between nodes, each of said plurality of paths including at least one of said plurality of links, the method comprising the steps of:
   (1) setting an initial capacity for each of said links of the network;
   (2) finding a minimum probability path among all of the paths of the network, said minimum probability path having a minimum probability P that packets are transmitted from a beginning to an end of said minimum probability path within a predetermined maximum allowable delay time;
   (3) finding a minimum probability link among all of the links included in said minimum probability path, said minimum probability link having a minimum probability that packets are transmitted from a beginning to an end of said minimum probability link within said predetermined maximum allowable delay time;
   (4) modifying the capacity of said minimum probability link; and
   (5) repeating steps 3 and 4 if said minimum probability P of said minimum probability path is less than a selected probability value, resulting in a design of a network which allows all packets to reach a destination node from a source node within said predetermined maximum allowable delay time with said selected probability value or greater probability value.

6. The method of claim 5, wherein said minimum probability path is found for all traffic classes of said packets.

7. The method of claim 5, wherein said minimum probability link is found for all traffic classes of said packets.

8. A network having link capabilities assigned in accordance with the method of claim 5.

9. A method of designing a packet-switching communication network having at least two nodes and at least one link from node-to-node for transmitting packets, the method comprising the steps of:
   (1) setting an initial capacity for each link of the network;
   (2) calculating a value of $Fx_{pq;k}(t_k)$ at $t_k = T_k$ for all p, q, k where $Fx_{pq;k}(t_k)$ is a distribution function of random variable $X_{pq;k}$ which defines a relationship between a delay time $t_k$ and a probability that packets of a traffic class k reach a destination node q from a source node p within said delay time $t_k$ and $T_K$ is a predetermined maximum allowable delay time for each traffic class k;
   (3) determining an end-to-end path defined by a node pair $p_O$–$q_O$ of the of the network for transmission of packets of a traffic class $k_o$, which satisfies the equation;

$Fx_{p_Oq_O;k_0}(T_{k0}) = \min \{Fx_{pq;k}(T_k)\}$ for all p, q, k, where $\min \{Fx_{pq;k}(T_k)\}$ represents the minimum value of $\{Fx_{pq;k}(T_k)\}$;

(4) calculating a value of $Fx_{i;k0}$ at $t_k = T_{k0}$ for all links $l_i$ included in said end-to-end path, where $Fx_{i;k0}(t_k)$ is a distribution function which defines relationship between a delay time $t_k$ and a probability that packets of a traffic class $k_0$ are transmitted from a beginning to an end of a link $l_i$ within said delay time $t_k$ and $T_{k0}$ is a predetermined maximum allowable delay time for a traffic class $k_0$;

(5) determining a link $l_{i0}$ which satisfies the equation:

$$Fx_{i0;k0}(T_{k0}) = \min \{Fx_{i;k0}(T_{k0})\} \text{ for all links } l_i$$
included in said end-to-end path, where min
$\{Fx_{i;k0}(T_{k0})\}$ represents the minimum value of
$\{Fx_{i;k0}(T_{k0})\}$;

(6) increasing the capacity of said link $l_{i0}$; and (7) repeating steps (2) through (6) if $Fx_{p0q0;k0}(T_{k0}) < P_{min}$, where $P_{min}$ is fixed probability value, resulting in a design of a network which allows all packets to reach a destination node from a source node within said predetermined maximum allowable delay time for all traffic classes with said fixed probability value or greater probability value.

10. A packet-switching communication network designed in accordance with the method of claim 9.

11. A packet-switching communication network having at least two nodes and at least one link from node-to-node for transmitting packets of a plurality of traffic classes, said network satisfying the following end-to-end delay distribution constraint:

$$P_{min} \leq P\{X_{pq;k} \leq T_k\} \text{ for all } p, q, k;$$

where $X_{pq;k}$ is a random variable representing a delay in a traffic class k on a path between a source node p and a destination node q, and $P\{X_{pq;k} < T_k\}$ is a probability that packets from the source node p in the traffic class k reach the destination node q within a predetermined delay time $T_k$ and $P_{min}$ is a predetermined constant.

12. An apparatus for designing a packet-switching communication network having at least two nodes and at least one link from node-to-node for transmitting packets, the apparatus comprising:

(1) means for setting an initial capacity for each link of said network;

(2) means for determining a most congested link based on delay distribution functions, each delay distribution function defining a relationship between a delay time and a probability that packets reach a destination node from a source node within said delay time;

(3) means for modifying the capacity of said most congested link; and (4) means for repeatedly applying said means for determining and means for modifying such that the value of each distribution function at a predetermined maximum allowable delay time is equal to or greater than a selected probability value for all paths from source nodes to destination nodes, resulting in a network which allows all packets to reach a destination node from a source node within said predetermined maximum allowable delay time with said selected probability value or greater probability value.

13. An apparatus for assigning capacities to a plurality of links of a network which has a plurality of paths between nodes, each of said plurality of paths including at least one of said plurality of links, the apparatus comprising:

(1) means for setting an initial capacity for each of said links of the network;

(2) means for finding a minimum probability path among all of paths of the network, said minimum probability path having a minimum probability P that packets are transmitted from a beginning to an end of said minimum probability path within a predetermined maximum allowable delay time;

(3) means for finding a minimum probability link among all of the links included in said minimum probability path, said minimum probability link having a minimum probability that packets are transmitted from a beginning to an end of said minimum probability link within said predetermined maximum allowable delay time;

(4) means for modifying the capacity of said minimum probability link; and (5) means for repeatedly applying said means for finding a minimum probability link and said means for modifying if said minimum probability P of said minimum probability path is less than a selected probability value, resulting in design of a network which allows all packets to reach a destination node form a source node within said predetermined maximum allowable delay time with said selected probability value or greater probability value.

14. An apparatus for designing a packet-switching communication network having at least two nodes and at least one link from node-to-node for transmitting packets, the apparatus comprising:

(1) means for setting an initial capacity for each link of the network;

(2) means for calculating a value of $Fx_{pq;k}(t_k)$ at $t_k = T_k$ for all p, q, k, where $FX_{pq;k}(t_k)$ is a distribution function of random variable $X_{pq;k}(t_k)$ which defines a relationship between a delay time $t_k$ and a probability that packets of traffic class k reach a destination node q from a source node p within said delay time $t_k$ and $T_k$ is a predetermined maximum allowable delay time for each traffic class k;

(3) means for determining an end-to-end path defined by a node pair $p_0$–$q_0$ of the network for transmission of packets of a traffic class $k_0$, which satisfies the equation:

$$Fx_{p0q0;k0}(T_{k0}) = \min \{Fx_{pq;k}(T_k)\} \text{ for all } p, q, k,$$
where min $\{Fx_{pq;k}(T_k)\}$ represents the minimum value of $\{Fx_{pq;k}(T_k)\}$;

(4) means for calculating a value of $Fx_{i;k0}(T_k)$ at $t_k = T_{k0}$ for all links $l_i$ included in said end-to-end path, where $Fx_{i;k0}(t_k)$ is a distribution function which defines a relationship between a delay time $t_k$ and a probability that packets of a traffic class $k_0$ are transmitted from a beginning to an end of a link $l_i$ within said delay time $t_k$ and $T_{k0}$ is a predetermined maximum allowable delay time for a traffic class $k_0$;

(5) means for determining a link $l_{i0}$ which satisfies the equation:

$$Fx_{i0;k0}(T_{k0}) = \min \{Fx_{i;k0}\} \text{ for all links } l_i \text{ included in}$$
said end-to-end path, where min $\{Fx_{i;k0}(T_{k0})\}$
represents the minimum value of $\{Fx_{i;k0}(T_{k0})\}$ (6) means for increasing the capacity of said link $l_{i0}$; and (7) means for repeatedly applying said means 2 through 6 if $Fx_{p0q0;k0}(T_{k0}) < P_{min}$, where $P_{min}$ is a fixed probability value, resulting in a design of a network which allows all packets to reach a destination node from a source node within said predetermined maximum allowable delay time for all traffic classes with said fixed probability value or greater probability value.

15. A method for constructing a packet-switching communication network having at least two nodes and at least one link from node-to-node for transmitting packets, the method comprising the steps of:
(1) setting an initial capacity for each link of said network;
(2) determining a most congested link based on delay distribution functions, each delay distribution function defining a relationship between a delay time and a probability that packets reach a destination node from a source node within said delay time;
(3) modifying the capacity of said most congested link;
(4) repeating steps (2) and (3) until the value of each distribution function at a predetermined maximum allowable delay time is equal to or greater than a selected probability value for all paths from source nodes to destination nodes; and
(5) establishing said link between nodes having capacity based on the foregoing steps, resulting in a network which allows all packets to reach a destination node from a source node within said predetermined maximum allowable delay time with said selected probability value or greater probability value.

16. A packet-switching communication network constructed in accordance with the method of claim 15.

17. A method for constructing a plurality of links in a network, which has a plurality of paths between nodes, each of said plurality of paths including at least one of said links, comprising the steps of:
(1) setting an initial capacity for each of said links of the network;
(2) finding a minimum probability path among all of the paths of the network, said minimum probability path having a minimum probability P that packets are transmitted from a beginning to an end of said minimum probability path within a predetermined maximum allowable delay time;
(3) finding a minimum probability link among all of the links included in said minimum probability path, said minimum probability link having a minimum probability that packets are transmitted from a beginning to and end of said minimum probability link within said predetermined maximum allowable delay time;
(4) modifying the capacity of said minimum probability link;
(5) repeating steps (3) and (4) if said minimum probability P of said minimum probability path is less than a selected probability value; and
(6) establishing said links between nodes having capacities based on the foregoing steps, resulting in a design of a network which allows all packets to reach a destination node from a source node within said predetermined maximum allowable delay time with said selected probability value or greater probability value.

18. A network having a plurality of links constructed in accordance with the method of claim 17.

19. A method of constructing a packet-switching communication network having at least two nodes and at least one link from node-to-node for transmitting packets, the method comprising the steps of:
(1) setting an initial capacity for each link of the network;
(2) calculating a value of $Fx_{pq;k}(t_k)$ at $t_k = T_k$ for all p, q, k, where $Fx_{pq;k}(t_k)$ is a distribution function of random variable $X_{pq;k}$ which defines a relationship between a delay time $t_k$ and a probability that packets of a traffic class k reach a destination node q from a source node p within said delay time $t_k$ and $T_k$ is a predetermined maximum allowable delay time for each traffic class k;
(3) determining an end-to-end path defined by a node pair $p_0$–$q_0$ of the network for transmission of packets of a traffic class k0, which satisfies the equation:

$Fx_{p0q0;k0}(T_{k0}) = \min \{Fx_{pq;k}(T_k)\}$ for all p, q, k, where min $\{Fx_{pq;k}(T_k)\}$ represents the minimum value of $\{Fx_{pq;k}(T_k)\}$;

(4) calculating a value of $Fx_{i;k0}(t_k)$ at $t_k = T_{k0}$ for all links $l_i$ included in said end-to-end path, where $Fx_{i;k0}(t_k)$ is a distribution function which defines a relationship between a delay time $t_k$ and a probability that packets of a traffic class k0 are transmitted from a beginning to an end of a link $l_i$ within said delay time $t_k$ and $T_{k0}$ is a predetermined maximum allowable delay time for a traffic class k0;
(5) determining a link $l_{i0}$ which satisfies the equation:

$Fx_{i0;k0}(T_{k0}) = \min \{Fx_{i;k0}(T_{k0})\}$ for all links $l_i$ included in said end-to-end path, where min $\{Fx_{i;k0}(T_{k0})\}$ represents the minimum of $\{Fx_{i;k0}(T_{k0})\}$;

(6) increasing the capacity of said link $l_{i0}$; and
(7) repeating steps (2) through (6) if $Fx_{p0q0;k0}(T_{k0}) < P_{min}$, where $P_{min}$ is fixed probability value; and
(8) establishing said links between nodes having capacities based on the foregoing steps, resulting in a design of a network which allows all packets to reach a destination node from a source node within said predetermined maximum allowable delay time for all traffic classes with said fixed probability value or greater probability value.

20. A packet-switching communication network constructed in accordance with the method of claim 19.

21. A method for designing a packet-switching communication network having at least two nodes and at least one link from node-to-node for transmitting packets of a plurality of traffic classes, the method comprising the steps of:
(1) setting an initial capacity for each link of said network;
(2) obtaining, for each link, a capacity increment $\Delta C^d_i$ required for satisfying a delay distribution constraint;
(3) obtaining, for each link, a capacity increment $\Delta C^l_i$ required for satisfying a loss probability constraint;
(4) finding a largest one of said increments $\Delta C^d_i$ and said increments $\Delta C^l_i$, and modifying the capacity of a link associated with said largest increment; and
(5) repeating steps (2) and (3) until a relationship of $\Delta C^d_i = \Delta C^l_i = 0$ is satisfied for all the links, resulting in a network which satisfies both said delay distribution constraint and said loss probability constraint.

22. The method according to claim 21, wherein said delay distribution constraint to be satisfied is:

$$P_{min} \leq P\{X_{pq;k} \leq T_k\} \text{ for all } p, q, k;$$

where $X_{pq;k}$ is a random variable representing a delay in a traffic class k on a path between a source node p and a destination node q, and $P\{X_{pq;k} < T_k\}$ is a probability that packets from the source node p in the traffic class k reach the destination node q within a delay time $T_k$ and $P_{min}$ is a constant probability value.

23. The method according to claim 21, wherein said loss probability constraint to be satisfied is:

$$L_{max;k} \geq L_{pq;k} \text{ for all } p, q, k;$$

where $L_{pq;k}$ is a probability that packets in a traffic class k from a source node p to a destination node q are lost and $L_{max;k}$ is a fixed probability value for each traffic class.

24. A packet-switching communication network constructed in accordance with the method of claim 21.

25. A packet-switching communication network having at least two nodes and at least one link from node-to-node for transmitting packets of a plurality of traffic classes, said at least two nodes and at least one link operatively connected to satisfy both the following delay distribution constraint and loss probability constraint, said delay distribution constraint being:

$$P_{min} \leq P\{X_{pq;k} \leq T_k\} \text{ for all } p, q, k;$$

where $X_{pq;k}$ is a random variable representing the delay in a traffic class k on a path between a source node p and a destination node q, and $P\{X_{pq;k} < T_k\}$ is a probability that packets from the source node p in the traffic class k reach the destination node q within a delay time $T_k$ and $P_{min}$ is a constant probability value; and said loss probability constraint being:

$$L_{max;k} \geq L_{pq;k} \text{ for all } p, q, k;$$

where $L_{pq;k}$ is a probability that packets in a traffic class k from a source node p to a destination node q are lost and $L_{max;k}$ is a fixed probability value for each traffic class.

26. An apparatus for designing a packet-switching communication network having at least two nodes and at least one link from-node-to-node for transmitting packets of a plurality of traffic classes, the apparatus comprising:

(1) means for setting an initial capacity for each link of said network;

(2) means for obtaining, for each link, a capacity increment $\Delta C^d_i$ required for satisfying a delay distribution constraint;

(3) means for obtaining, for each link, a capacity increment $\Delta C^l_i$ required for satisfying a loss probability constraint;

(4) means for finding a largest one of said increments $\Delta C^d_i$ and said increments $\Delta C^l_i$, and modifying the capacity of a link associated with said largest increment; and (5) means for repeatedly applying said means for obtaining $\Delta C^d_i$ and $\Delta C^l_i$ until a relationship of $\Delta C^d_i = \Delta C^l_i = 0$ is satisfied for all the links, resulting in a network which satisfies both said delay distribution constraint and said loss probability constraint.

27. A method of constructing a packet-switching communication network having at least two nodes and at least one link from-node-to-node for transmitting packets of a plurality of traffic classes, the method comprising the steps of:

(1) setting an initial capacity for each link of said network;

(2) obtaining, for each link, a capacity increment $\Delta C^d_i$ required for satisfying a delay distribution constraint;

(3) obtaining, for each link, a capacity increment $\Delta C^l_i$ required for satisfying a loss probability constraint;

(4) finding a largest one of said increments $\Delta C^d_i$ and said increments $\Delta C^l_i$, and modifying the capacity of a link associated with said largest increment;

(5) repeating steps (2) and (3) until a relationship of $\Delta C^d_i = \Delta C^l_i = 0$ is satisfied for all the links; and (6) establishing said link having capacity based on the foregoing steps in said network, resulting in a network which satisfies both said delay distribution constraint and said loss probability constraint.

28. The method according to claim 27, wherein said delay distribution constraint to be satisfied is:

$$P_{min} \leq P\{X_{pq;k} \leq T_k\} \text{ for all } p, q, k;$$

where $X_{pq;k}$ is a random variable representing the delay in a traffic class k on a path between a source node p and a destination node q, and $P\{X_{pq;k} \leq T_k\}$ is a probability that packets from the source node p in the traffic class k reach the destination node q within a delay time $T_k$ and $P_{min}$ is a constant probability value.

29. The method according to claim 27, wherein said loss probability constraint to be satisfied is:

$$L_{max;k} \geq L_{pq;k} \text{ for all } p, q, k;$$

where $L_{pq;k}$ is a probability that packets in the traffic class k from the source node p to the destination node q are lost and $L_{max;k}$ is a fixed probability value for each traffic class.

30. A packet-switching communication network constructed in accordance with the method of claim 27.

* * * * *